(12) United States Patent
Pather et al.

(10) Patent No.: US 7,797,306 B1
(45) Date of Patent: *Sep. 14, 2010

(54) SYSTEM AND METHOD FOR PROVIDING NOTIFICATION(S) IN ACCORDANCE WITH MIDDLEWARE TECHNOLOGIES

(75) Inventors: Shyamalan Pather, Seattle, WA (US); Lon Eugene Fisher, Sammamish, WA (US); Richard Dievendorff, Bellevue, WA (US); Praveen Seshadri, Bellevue, WA (US); Philip Garrett, Woodinville, WA (US); Holly Knight, Woodinville, WA (US); Vincent H. Curley, Bellevue, WA (US); Robert F. Blanch, Clyde Hill, WA (US); Charles Tete Mensa-Annan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 859 days.

This patent is subject to a terminal disclaimer.

(21) Appl. No.: 10/375,628

(22) Filed: Feb. 26, 2003

Related U.S. Application Data

(63) Continuation-in-part of application No. 10/180,360, filed on Jun. 26, 2002.

(51) Int. Cl.
*G06F 7/00* (2006.01)
(52) U.S. Cl. .................................. 707/714; 707/732
(58) Field of Classification Search .............. 707/1, 707/4, 714, 732; 719/318
See application file for complete search history.

(56) References Cited

U.S. PATENT DOCUMENTS

| | | |
|---|---|---|
| 4,774,658 A | 9/1988 | Lewin |
| 5,301,326 A | 4/1994 | Linnett |
| 5,367,633 A | 11/1994 | Matheny et al. |
| 5,416,725 A | 5/1995 | Pacheco et al. |
| 5,481,700 A | 1/1996 | Thuraisingham |
| 5,555,346 A | 9/1996 | Gross et al. |
| 5,760,768 A | 6/1998 | Gram |
| 5,813,007 A | 9/1998 | Nielsen |
| 5,835,768 A | 11/1998 | Miller |

(Continued)

OTHER PUBLICATIONS

"Global XML Web Services Architecture" White Paper, Oct. 2001, Microsoft Corporation, 11 pages.*

(Continued)

*Primary Examiner*—Hung T Vy
*Assistant Examiner*—Michael Le
(74) *Attorney, Agent, or Firm*—Workman Nydegger

(57) ABSTRACT

The present invention relates to a system and methodology to facilitate subscription, delivery, processing, and reception of notification services. A global service framework is provided that operates in conjunction with a notification platform architecture to deliver information from one or more event sources to one or more notification sinks that receive information from the services. The global framework includes discovery and description components that provide information relating to available notification services. Subscriptions can be obtained via subscription events, whereby notifications can be delivered via notification events, wherein such events can be modeled as part of the global service framework. Various communications protocols can also be provided to facilitate communications with the notification services and global services framework. Furthermore, various notification delivery protocols can be provided that operate with structured database technologies to facilitate bulk message delivery and service in a reliable manner while mitigating network problems such as delivering notifications under power-interrupting conditions.

30 Claims, 19 Drawing Sheets

U.S. PATENT DOCUMENTS

| | | | |
|---|---|---|---|
| 5,852,812 A | 12/1998 | Reeder | |
| 5,870,746 A | 2/1999 | Knutson | |
| 5,893,091 A | 4/1999 | Hunt et al. | |
| 5,973,612 A | 10/1999 | Deo et al. | |
| 5,974,406 A | 10/1999 | Bisdikian et al. | |
| 5,999,978 A | 12/1999 | Angal et al. | |
| 6,016,394 A | 1/2000 | Walker | |
| 6,021,403 A * | 2/2000 | Horvitz et al. | 706/45 |
| 6,026,235 A | 2/2000 | Shaughnessy | |
| 6,055,505 A * | 4/2000 | Elston | 705/1 |
| 6,055,570 A | 4/2000 | Nielsen | |
| 6,108,712 A | 8/2000 | Hayes | |
| 6,112,192 A | 8/2000 | Capek | |
| 6,122,633 A | 9/2000 | Leymann et al. | |
| 6,138,158 A | 10/2000 | Boyle et al. | |
| 6,151,643 A | 11/2000 | Cheng et al. | |
| 6,167,448 A | 12/2000 | Hemphill et al. | |
| 6,173,284 B1 | 1/2001 | Brown | |
| 6,185,613 B1 | 2/2001 | Lawson et al. | |
| 6,208,996 B1 | 3/2001 | Ben-Shachar et al. | |
| 6,209,011 B1 | 3/2001 | Vong et al. | |
| 6,219,782 B1 | 4/2001 | Khan et al. | |
| 6,256,664 B1 | 7/2001 | Donoho et al. | |
| 6,260,148 B1 | 7/2001 | Aggarwal et al. | |
| 6,275,957 B1 | 8/2001 | Novik et al. | |
| 6,292,825 B1 | 9/2001 | Chang et al. | |
| 6,314,533 B1 | 11/2001 | Novik et al. | |
| 6,327,705 B1 | 12/2001 | Larsson | |
| 6,330,566 B1 | 12/2001 | Durham | |
| 6,343,376 B1 | 1/2002 | Saxe | |
| 6,353,926 B1 | 3/2002 | Parthesarathy et al. | |
| 6,400,810 B1 | 6/2002 | Skladman et al. | |
| 6,405,191 B1 | 6/2002 | Bhatt et al. | |
| 6,424,966 B1 | 7/2002 | Meyerzon et al. | |
| 6,438,618 B1 | 8/2002 | Lortz et al. | |
| 6,446,092 B1 | 9/2002 | Sulter | |
| 6,466,949 B2 | 10/2002 | Yang et al. | |
| 6,480,885 B1 | 11/2002 | Olivier | |
| 6,484,149 B1 | 11/2002 | Jammes | |
| 6,487,548 B1 | 11/2002 | Leymann et al. | |
| 6,490,633 B1 | 12/2002 | Linnett | |
| 6,490,718 B1 | 12/2002 | Watters | |
| 6,510,429 B1 * | 1/2003 | Todd | 705/36 R |
| 6,513,026 B1 | 1/2003 | Horvitz et al. | |
| 6,532,471 B1 | 3/2003 | Ku | |
| 6,564,251 B2 | 5/2003 | Katariya | |
| 6,574,552 B2 | 6/2003 | Yano et al. | |
| 6,601,012 B1 | 7/2003 | Horvitz et al. | |
| 6,606,618 B2 | 8/2003 | Delo | |
| 6,629,138 B1 | 9/2003 | Lambert et al. | |
| 6,643,682 B1 | 11/2003 | Todd et al. | |
| 6,662,195 B1 | 12/2003 | Langseth et al. | |
| 6,704,803 B2 | 3/2004 | Wilson et al. | |
| 6,745,180 B2 | 6/2004 | Yamanoue | |
| 6,745,193 B1 | 6/2004 | Horvitz | |
| 6,748,318 B1 | 6/2004 | Jones | |
| 6,751,657 B1 | 6/2004 | Zothner | |
| 6,766,329 B1 | 7/2004 | Nicholson | |
| 6,807,482 B2 | 10/2004 | Utsumi | |
| 6,826,560 B1 | 11/2004 | Leymann et al. | |
| 6,829,478 B1 | 12/2004 | Layton et al. | |
| 6,829,639 B1 | 12/2004 | Lawson et al. | |
| 6,829,770 B1 | 12/2004 | Hinson et al. | |
| 6,839,730 B1 | 1/2005 | Ramabhadran | |
| 6,847,889 B2 | 1/2005 | Park et al. | |
| 6,904,383 B2 | 6/2005 | Tanaka et al. | |
| 6,910,033 B2 | 6/2005 | Rosenblum | |
| 6,910,070 B1 | 6/2005 | Mishra et al. | |
| 6,920,616 B1 | 7/2005 | Abbott | |
| 6,938,240 B2 | 8/2005 | Charisius et al. | |
| 6,981,250 B1 | 12/2005 | Wiltamuth et al. | |
| 6,988,262 B1 | 1/2006 | Mallory et al. | |
| 7,032,115 B2 | 4/2006 | Kashani | |
| 7,137,099 B2 | 11/2006 | Knight | |
| 7,266,595 B1 | 9/2007 | Black | |
| 7,275,235 B2 | 9/2007 | Molinari | |
| 2001/0009016 A1 | 7/2001 | Hofmann et al. | |
| 2002/0010804 A1 | 1/2002 | Sanghvi et al. | |
| 2002/0032597 A1 | 3/2002 | Chanos | |
| 2002/0032602 A1 | 3/2002 | Lanzillo et al. | |
| 2002/0032771 A1 | 3/2002 | Gledje | |
| 2002/0035482 A1 | 3/2002 | Coble et al. | |
| 2002/0069244 A1 | 6/2002 | Blair et al. | |
| 2002/0075293 A1 | 6/2002 | Charisius et al. | |
| 2002/0077842 A1 | 6/2002 | Charisius et al. | |
| 2002/0077910 A1 | 6/2002 | Shioda et al. | |
| 2002/0080938 A1 | 6/2002 | Alexander et al. | |
| 2002/0082919 A1 | 6/2002 | Landau et al. | |
| 2002/0087388 A1 | 7/2002 | Keil | |
| 2002/0087740 A1 | 7/2002 | Castanho et al. | |
| 2002/0095399 A1 | 7/2002 | Devine et al. | |
| 2002/0115423 A1 | 8/2002 | Hatae et al. | |
| 2002/0120711 A1 | 8/2002 | Bantz et al. | |
| 2002/0135614 A1 | 9/2002 | Bennett | |
| 2002/0136173 A1 | 9/2002 | Monroe et al. | |
| 2002/0154010 A1 * | 10/2002 | Tu et al. | 340/517 |
| 2002/0165729 A1 | 11/2002 | Kuebert et al. | |
| 2002/0167488 A1 | 11/2002 | Hinckley et al. | |
| 2002/0194305 A1 | 12/2002 | Sadeghi et al. | |
| 2003/0023435 A1 | 1/2003 | Josephson | |
| 2003/0025599 A1 | 2/2003 | Monroe | |
| 2003/0046539 A1 | 3/2003 | Negawa | |
| 2003/0050046 A1 | 3/2003 | Conneely et al. | |
| 2003/0069002 A1 | 4/2003 | Hunter et al. | |
| 2003/0083952 A1 | 5/2003 | Simpson et al. | |
| 2003/0101322 A1 | 5/2003 | Gardner | |
| 2003/0105732 A1 | 6/2003 | Kagalwala | |
| 2003/0126136 A1 | 7/2003 | Omoigui | |
| 2003/0131143 A1 | 7/2003 | Myers | |
| 2003/0154193 A1 | 8/2003 | Rosenblum | |
| 2003/0172368 A1 | 9/2003 | Alumbaugh | |
| 2003/0177402 A1 * | 9/2003 | Piazza | 713/300 |
| 2004/0002988 A1 | 1/2004 | Seshadri et al. | |
| 2004/0083463 A1 | 4/2004 | Hawley | |
| 2004/0128359 A1 | 7/2004 | Horvitz et al. | |
| 2004/0155901 A1 | 8/2004 | McKee | |
| 2005/0091184 A1 | 4/2005 | Seshadri | |
| 2005/0091269 A1 | 4/2005 | Gerber | |

OTHER PUBLICATIONS

"An Introduction to Microsoft Transaction Server", Jan. 8, 1998, Microsoft Corporation, 5 pages printed Oct. 21, 2005 from http://msdn.microsoft.com/archive/en-s/dnarmts/html/msdn_mtsintro.asp.*

Schmidt, Eric, "Reliable XML Web Services", Dec. 11, 2001, Microsoft MSDN, 10 pages printed on Apr. 7, 2006.*

Sasu Tarkoma, "Scalable Internet Event Notification Architecture (Siena)", Spring 2002, Helsinki, 9 pages.

Steve Trythall, "JMS and COBRA Notification Interworking," Dec. 12, 2001, www.oreilly.com, 9 pages.

Ellen Muraskin, "Notification Engines and Apps", Oct. 5, 2001, www.convergence.com, 11 pages.

"Event Broker/Monitor (BEA Tuxedo System)", 1999, http://edocs.bea.com/wle/wle42/admin/events.htp, 5 pages.

Rosenblum, et al., "A Design Framework for Internet-Scale Event Observation and Notification", 1998, 17 pages.

Microsoft Corp., "Microsoft SQL Server Notification Services Technical Overview", Apr. 2002, White Paper, 23 pages.

Rob Taylor, "Transact-SQL", Dec. 20, 2000, SQLTeam.com, 2 pages printed on Jan. 26, 2005 from http://www.sqlteam.com/item.asp?ItemID=1650.

Michael Kantor and David Redmiles, Creating an Infrastructure for Ubiquitous Awareness, Information and Computer Science, University of California, Irvine 92697, 2001.

Bowman, et al. "The Practical SQL Handbook: Using SQL Varients", 2001, pearson technology group, 4th Edition.

Antonio Carzaniga, Design of a Scalable Event Notification Service: Interface and Architecture, Aug. 1998, U. of Colorado.

Bernheim Brush, et al., "Notification for shared annotation of digital documents", Apr. 2002, ACM Press, vol. 4, Issue No. 1, pp. 89-96.

Chou, et al., "Versions and change notification in an object-oriented database system", Jun. 1988, IEEE Computer Society Press, Paper 20.4 275-281.

Gruber, et al. "High-level constructs in the READY event notification system", Sep. 1998, ACM Press, p. 195-202.

IEEE, "The Authoritative Dictionary of IEEE Standards Terms", 2000, 7th Edition, p. 701.

U.S. Appl. No. 10/180,360, filed Jun. 26, 2002, Seshadri, et al.

U.S. Appl. No. 10/376,197, filed Feb. 26, 2003, Seshadri, et al.

U.S. Appl. No. 10/373,328, filed Feb. 24, 2003, Pather, et al.

U.S. Appl. No. 10/375,300, filed Feb. 27, 2003, Pather, et al.

U.S. Appl. No. 10/375,250, filed Feb. 27, 2003, Seshadri, et al.

BEA Systems, "Event Subscription and Notifications", 2000, 4 pages, printed Jul. 25, 2005 from http://e-docs.bea.com/tuxedo/tux71/html/dvlibra7.htm.

Hanson, et al., "A Flexible and Recoverable Client/Server Database Event Notification System", VLDB Journal, 1998, vol. 7, pp. 12-24.

"Configurable Interface for Processing Notifications", Aug. 19, 1999, www.sba.widener.edu/saphelp, printed Mar. 6, 2003, 3 pages.

IEEE, "The Authoritative Dictionary of IEEE Standards Terms", 2000, 7th Edition, p. 701.

"Interactive Notification Server", www.brience.com, Copyright 2000-2000, printed Mar. 10, 2003, 5 pages.

Vassili Bykov, "TOPlink for SmallTalk 5.0: What's new, what's old?", Smalltalk Chronicles, vol. 1, No. 2, Sep. 1999, printed Mar. 19, 2003, 9 pages.

Berndtsson, et al., "Cooperative Problem Solving: A New Direction for Active Databases", 1996, 4 pages, 2 pages of citation.

Stelovsky et al., Software Architecture for Unified Architecture for Unified Management of Event Notification and Stream I/O and its Use for Recording and Analysis of User Events, Jan. 7-10, 2002, IEEE, 1862-1867.

Cabrera et al., Herald: Archiving a Global Event Notification Service, May 20-22, 2001, IEEE, 87-92.

Fernando Bellas et al., A Flexible Framework for Engineering "My" Portals, WWW 2004, May 17-22, 2004, pp. 234-243, ACM, New York, NY.

Gustavo Rossi et al., Designing Personalized Web Applications, WWW01, May 2001, pp. 275-284, ACM, Hong Kong.

Peter Haddawy, et al., Preference Elicitation via Theory Refinement, Journal of Machine Learning Research, Jul. 2003, pp. 317-337, vol. 4.

Lisa Purvis et al., Creating Personalized Documents: An Optimization Approach, Doc Eng '03, Nov. 20-22, 2003, pp. 68-77, ACM, Grenoble, France.

Woojin Paik et al., Applying Natural Language Processing (NLP) Based Metadata Extraction to Automatically Acquire User Preferences, K-CAP '01, Oct. 2001, pp. 116-122, ACM, Victoria, British Columbia, Canada.

Vincent Trans, International Search Report, PCT/US04/24296 ISA/US, Alexandria, Virginia, US, Nov. 18, 2004, 3 Pages.

IBM ADA/6000, Synopsis, www.calply.edu/~ias/userguides/CentralUNIX/world/AIX40105.doc, Sep. 2, 1998, 13 Pages.

E.W. Giering. Compile Time Scheduling of an Ada Subset. Washington Ada Symposium Proceedings, Jun. 1990, pp. 143-155.

International Search Report dated Jun. 2, 2005 for PCT Application Serial No. US04/24049, 5 Pages.

Bailey, James, "An Event-Condition-Action Language for XML" May 7-11, 2001, http://www2002.org/CDROM/refereed/323.

Microsoft Press Computer Dictionary, Third Edition, 1997.

Microsoft XP, Print Screens.

"Algorithmic Solutions Software GmbH", Oct. 16, 2002, http://www.algorithmic-solutions.com/leda-manual/introduction.html.

Office Action dated Nov. 3, 2005 cited in U.S. Appl. No. 10/376,197.
Office Action dated Apr. 14, 2006 cited in U.S. Appl. No. 10/376,197.
Office Action dated Sep. 29, 2006 cited in U.S. Appl. No. 10/376,197.
Office Action dated Mar. 8, 2007 cited in U.S. Appl. No. 10/376,197.
Office Action dated Sep. 25, 2007 cited in U.S. Appl. No. 10/376,197.
Office Action dated Mar. 27, 2008 cited in U.S. Appl. No. 10/376,197.
Office Action dated Dec. 29, 2008 cited in U.S. Appl. No. 10/376,197.
Notice of Allowance dated Jun. 11, 2009 cited in U.S. Appl. No. 10/376,197.
Office Action dated Oct. 5, 2005 cited in U.S. Appl. No. 10/373,328.
Office Action dated Mar. 24, 2006 cited in U.S. Appl. No. 10/373,328.
Office Action dated Sep. 28, 2006 cited in U.S. Appl. No. 10/373,328.
Office Action dated Mar. 26, 2007 cited in U.S. Appl. No. 10/373,328.
Office Action dated Dec. 28, 2007 cited in U.S. Appl. No. 10/373,328.
Office Action dated Jun. 26, 2008 cited in U.S. Appl. No. 10/373,328.
Notice of Allowance dated Jan. 6, 2009 cited in U.S. Appl. No. 10/373,328.
Office Action dated Jan. 22, 2007 cited in U.S. Appl. No. 10/693,735.
Office Action dated Jun. 21, 2007 cited in U.S. Appl. No. 10/693,735.
Office Action dated Feb. 17, 2007 cited in U.S. Appl. No. 10/693,735.
Office Action dated Jun. 10, 2008 cited in U.S. Appl. No. 10/693,735.
Office Action dated Feb. 19, 2009 cited in U.S. Appl. No. 10/693,735.
Notice of Allowance dated Aug. 19, 2009 cited in U.S. Appl. No. 10/693,735.
Office Action dated Oct. 20, 2005 cited in U.S. Appl. No. 10/375,250.
Office Action dated Mar. 14, 2006 cited in U.S. Appl. No. 10/375,250.
Office Action dated Aug. 22, 2006 cited in U.S. Appl. No. 10/375,250.
Notice of Allowance dated Feb. 7, 2007 cited in U.S. Appl. No. 10/375,250.
Office Action dated Feb. 14, 2006 cited in U.S. Appl. No. 10/375,300.
Office Action dated Jul. 26, 2006 cited in U.S. Appl. No. 10/375,300.
Office Action dated Dec. 20, 2006 cited in U.S. Appl. No. 10/375,300.
Office Action dated Jun. 1, 2007 cited in U.S. Appl. No. 10/375,300.
Notice of Allowance dated Jan. 17, 2008 cited in U.S. Appl. No. 10/375,300.
Notice of Allowance dated Dec. 4, 2009 cited in U.S. Appl. No. 10/376,197.

* cited by examiner

SYSTEM AND METHOD FOR PROVIDING NOTIFICATION(S) IN ACCORDANCE WITH MIDDLEWARE TECHNOLOGIES

REFERENCE TO RELATED APPLICATION(S)

This application is a continuation in part of U.S. patent application Ser. No. 10/180,360 which was filed Jun. 26, 2002, entitled System and Method for Providing Notification (s), the entirety of which is incorporated herein by reference.

TECHNICAL FIELD

The present invention relates generally to computer systems, and more particularly to a system and method for servicing and processing subscription applications, notifications, and events in accordance with various middleware technologies such as provided by a global XML framework, queuing/transaction mechanisms and delivery protocols.

BACKGROUND OF THE INVENTION

Empowering people to make well-informed decisions has become increasingly important in today's fast-paced environment. Providing individuals with relevant and timely information is an essential element in facilitating such well-informed decisions. However, certain information that is noise to some may be very valuable to others. Additionally, some information can also be temporally critical and as such there may be significant value associated with timely delivery of such information. Moreover, some individuals prefer to stay apprised of information, even though not critical. A challenge is to provide information in a desired manner notwithstanding vast differences in individuals' information and delivery preferences.

Many conventional methods of gathering information require proactively requesting and searching for the information, often mandating sifting through dozens of messages, hundreds of articles, or referencing numbers or trends in reports. Furthermore, existing technologies assume that a person desiring such information is at a computer and has time and ability to retrieve the information. Moreover, people are increasingly mobile and cannot always be within close proximity of a computer. As a result, Internet-enabled mobile devices are becoming increasingly popular and have generated demand for services that deliver timely, personalized information regardless of location, on whatever suitable device is available and accessible.

Some have attempted to accommodate such demand by building systems that allow individuals to subscribe to an application that automatically delivers information of interest. However, most of such information delivery systems have been poorly built employing ad-hoc techniques. Additionally, conventional systems have difficulty with respect to scaling because of the complexity associated with processing meaningful queries in connection with a large number of disparate events or publications, and delivering results to subscribers given the varying types of individual delivery preferences as well as recipient device types. Consequently, conventional notification systems are inefficient, difficult to maintain and administer, unreliable, and are inadequate for hosting large-scale applications.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a system and methodology for processing notifications in accordance with a global network service framework and according to various database applications/mechanisms for reliable notification service and delivery. In one aspect of the present invention, the global framework can include a discovery component to facilitate remote network determinations of available notification services, wherein the discovery component can be associated with a description component that describes details or components of the services. If services are desired, subscription events can be provided that enable one or more subscribers to acquire or purchase a subscription to a notification service. If a subscription is acquired, notifications from the service can then be provided to information consumers via a notification event associated with the subscribed service. In another aspect, various protocols and schemas are provided to facilitate discovering, describing, subscribing, processing and receiving notifications from the notification service. These can include asynchronous protocols such as a routing protocol for message delivery between a plurality of nodes (e.g., protocol describes end-points of delivery having multiple hops between nodes). Other protocols include various XML protocols such as Simple Object Access Protocol (SOAP) and Web Service Description Language (WSDL), for example that can be adapted in accordance with various schemas for subscribing, delivering, and receiving notifications. Messages or notifications can also be processed in accordance with one or more delivery protocols that interact with commercially available network servers/databases for processing large amounts of notification data. Such delivery protocols include message queuing functions operating with SQL database applications involving event provider and event collector processes to determine if messages have been suitably delivered. These processes can interact with one or more Distributed Transaction Coordinator (DTC) functions or transactions, for example, in order to process/transmit data from multiple sources in a reliable manner.

In general, the above framework and protocols are adapted to an automated notification system that facilitates providing notification services via a notification architecture that is highly scalable and can process a large volume of queries with respect to a plurality of disparate subscription service providers and subscribers. One aspect of the subject invention provides for a notification platform that facilitates building and maintaining reliable, high performance, and scalable applications. More particularly, the platform of the subject invention provides a manner in which to express event schema, subscription schema, notification schema, and rules in a rich manner (e.g., XML) as well as allowing a subscription service provider to express content formatting and protocols that can be implemented in connection with distributing notifications. The invention includes an execution engine that integrates information propagated in accordance with the aforementioned schema, formatting and protocols to provide highly scalable notification services.

Another aspect of the invention provides for abstracting subscription and subscriber information (as well as event information if desired) to high-level classes (e.g., data fields)—thus the invention provides for modeling such notification related information as data. Subscription applications can thus be developed at high levels wherein complex subscription queries and subscriber information can be defined as data fields for example. Databases in accordance with the data fields can be propagated with subscription/subscriber specific information. The present invention takes advantages of the processing power associated with database engines (e.g., SQL server) to generate notifications via performing a join operation on the tables (e.g., subscription table(s), subscriber table(s) and event table(s)). Accordingly, notifications are generated en masse, as compared to per subscription per subscriber which can consume significant computing resources. By modeling the notification related information (e.g., subscription queries, subscriber information, event information . . . ) as data and leveraging the power of relational database systems to perform set-oriented manipulations on this data efficiently, the present invention provides for a highly scalable and efficient notification system.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION OF THE INVENTION

The present invention relates to a system and methodology to facilitate subscription, delivery, processing, and reception of notification services. A global service framework is provided that operates in conjunction with a notification platform architecture to deliver information from one or more event sources to one or more notification sinks that receive information from the services. The global framework includes discovery and description components that provide information relating to available notification services (e.g., discovery/description of a service distributing notifications from a plurality of electronic information providers). Subscriptions can be obtained via subscription events, whereby notifications can be delivered via notification events, wherein such events can be modeled as part of the global service framework. Various communications protocols can also be provided to facilitate communications with the notification services and global services framework (e.g., SOAP, WSDL, DIME, and so forth). Furthermore, various notification delivery protocols can be provided that operate with structured database technologies to facilitate bulk message delivery and service in a reliable manner while mitigating network problems such as delivering notifications under power-interrupting conditions.

As used in this application, the terms "component," "service," "protocol," and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
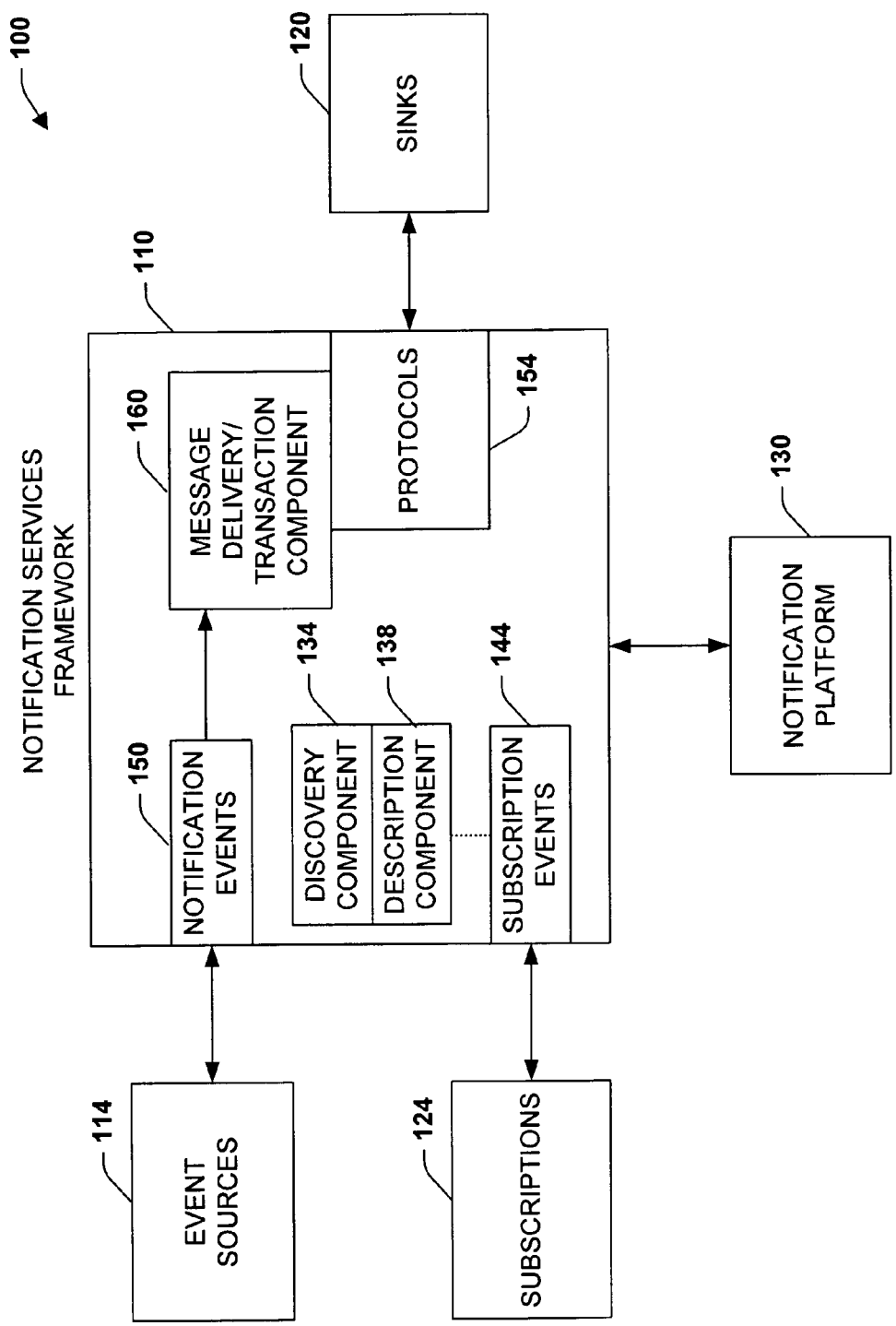
FIG. 1 is a schematic block diagram of a notifications services framework in accordance with an aspect of the present invention.

Referring initially to FIG. 1, a notification system 100 operative in a global services environment is illustrated in accordance with an aspect of the present invention. The system 100 employs a notification services framework 110 to distribute information from one or more event sources 114 that generate notifications to one or more notification sinks 120 that receive information from the sources. In order to receive information from the event sources 114, one or more subscriptions 124 are obtained via the notification framework to determine which of the event sources cause automated notifications to occur at the notification sinks 120. For example, a news subscription may request notifications from three different news sources such as a breaking news source, a sports source, and a financial news source. If a subscriber has suitably subscribed to this type news subscription, then notifications that are generated from any of the three sources can be passed to the notification sinks 120 selected for receiving information from the event sources 114. In addition to the notification services framework 110, the system 100 can operate in accordance with a notification platform 130 that performs various database and communications operations to collect information from the event sources 114 and distribute information to the notification sinks 120. It is also noted that various systems and components can be provided to facilitate operations between the notification platform 130, event sources 114 and notification sinks 120 which are described in more detail below.

The notification services framework 110 operates in accordance with a global network service architecture (e.g., Global XML Architecture (GXA)) and according to various database applications/mechanisms associated with the notification platform 130 for reliable notification service and delivery. The notification services framework 110 can include a discovery component 134 to facilitate remote network determinations of notification services available to the subscriber, wherein the discovery component 134 can be associated with a description component 138 that describes details or components of the services. If services are desired, subscription events 144 can be provided and initiated that enable one or more subscribers to acquire or purchase the subscriptions 124 to a respective notification service. If a subscription is acquired, notifications from the service can then be provided to information consumers via one or more notification events 150 associated with the subscribed service. In another aspect, various protocols 154 can be provided to facilitate discovering, describing, subscribing, processing and receiving notifications in accordance with the notification services framework 110. These protocols 154 can include asynchronous protocols such as a routing protocol for message delivery between a plurality of nodes (e.g., protocol describes endpoints of delivery having multiple hops between nodes). Other protocols 154 include various XML protocols such as Simple Object Access Protocol (SOAP) and Web Service Description Language (WSDL), for example, that can be adapted in accordance with various schemas for subscribing, delivery, and receiving notifications from the event sources 114. Messages or notifications can also be processed according to one or more delivery protocols that interact with commercially available network servers/databases associated with the notification platform 130 for processing large amounts of notification data. Such delivery protocols can be executed by a message/transaction component 160 that includes message queuing functions operating with database applications involving event provider and event collector processes to determine if messages have been suitably delivered to the notification sinks 120. These processes can interact with one or more Distributed Transaction Coordinator (DTC) functions or transactions in the message/transaction component 160, for example, in order to process/transmit data from multiple event sources 114 in a reliable manner.

Figure 2:
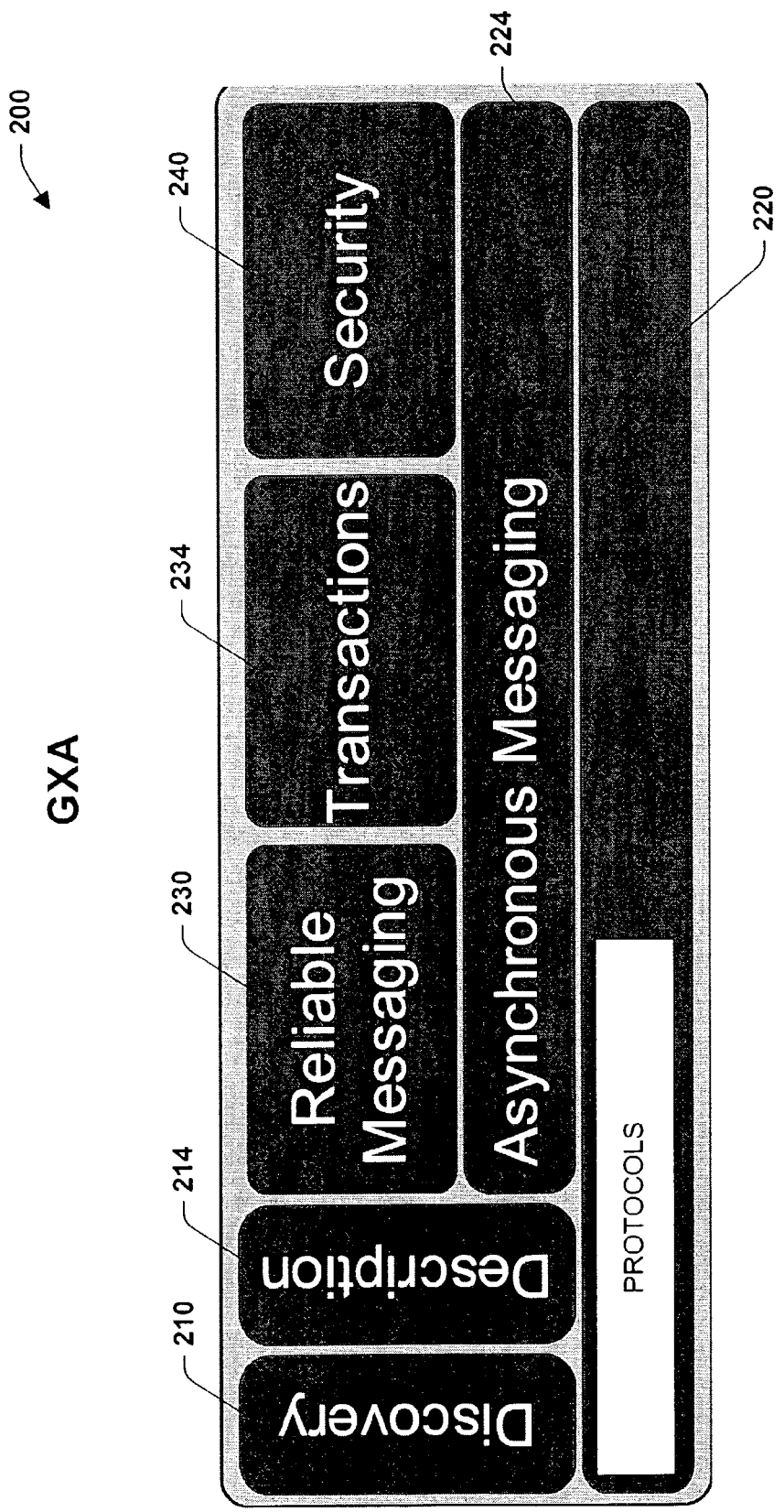
FIG. 2 is a diagram of a global services framework in accordance with an aspect of the present invention.

Referring now to FIG. 2, a global XML web services architecture (GXA) 200 is illustrated in accordance with an aspect of the present invention. The GXA 200 can be utilized to facilitate notification subscription and delivery from source to sink, wherein the GXA can be integrated or associated with a notification platform that is described in more detail below. In one aspect, the GXA 200 includes a discovery component 210 such as a UDDI that is described below and a description component 214 for determining available subscription services. As illustrated, a protocol layer 220 can be employed for interactions with the GXA 200 and associated notification platform which is described below. Other layers in the GXA 200 include an asynchronous messaging layer 224 for routing notifications, a reliable messaging component 230 and transactions component 234 for processing/delivering notifications, and a security component 240 to facilitate secure message delivery while mitigating intrusions such as from hackers.

One premise of GXA 200 is that application developers generally do not want to rebuild an entire platform for each application. This premise has dominated the single-machine development model in which 95% of programmers in the world write applications that utilize a platform built by the remaining 5%. The traditional single-machine world of software development has had decades to formalize modularization techniques, which makes the separation between application and platform clean and easily understood. The world of communication protocols also coined its share of modularization techniques, of which the most well-known is the concept of protocol layering, exemplified by the OSI seven-layer protocol stack. Other modularization techniques have existed within the research community for some time; however, few if any, are known to the average application programmer. A design goal of GXA 200 is to (a) provide a more formal model for protocol modularity and (b) provide a family of platform-level protocols for application developers to utilize in their Web services and applications (e.g., notification processing of subscriptions, sources, and sinks). Just as an operating system provides commonly used facilities such as thread scheduling, access checks, and memory management, GXA 200 provides a set of common facilities 210-240 that can be employed by a wide number of Web services and applications.

The GXA 200 builds on ideas such as traditional protocol layering and encapsulation. A characteristic of GXA 200 is that protocol features that cross-cut a broad range of applications are factored independently from application-specific protocols. This factoring allows individual infrastructure protocols to be reused in a variety of contexts. In addition to defining a family of infrastructure protocols, GXA 200 also lays out a policy-based framework for establishing which of these protocols will be utilized for a desired set or subset of message exchanges. Since GXA 200 is generally a family of wire-level protocols, the conceptual model behind GXA does not need to be shared by applications that interact with GXA-based Web services.

GXA 200 distinguishes between application protocols and infrastructure protocols. Application protocols are specific to a particular application domain. Application protocols have semantics that are expressed as a series of domain-specific message exchanges. Though there has been some success in the past at defining application protocols that span a vertical market segment (e.g., supply-chain management or health care), most application protocols tend to be ad hoc and are defined by one or at most two parties for communicating with specific applications. Infrastructure protocols tend to transcend specific application domains and focus on adding value to a broad range of application protocols. Because infrastructure protocols are not tied to a specific application domain, infrastructure protocols tend to be somewhat limited by themselves. Rather, infrastructure protocols are designed to be composed with an application protocol, typically by augmenting the message exchanges that are already in place.

GXA 200 provides a framework for composing infrastructure protocols with application protocols. This framework is agnostic to the underlying transport, framing, and marshaling protocol. Thus, GXA 200 is generally specified in terms of SOAP, which is the dominant protocol for Web services. It is to be appreciated that GXA protocols may be employed in other contexts such as defining non-SOAP-based bindings for GXA protocols.

Figure 3:
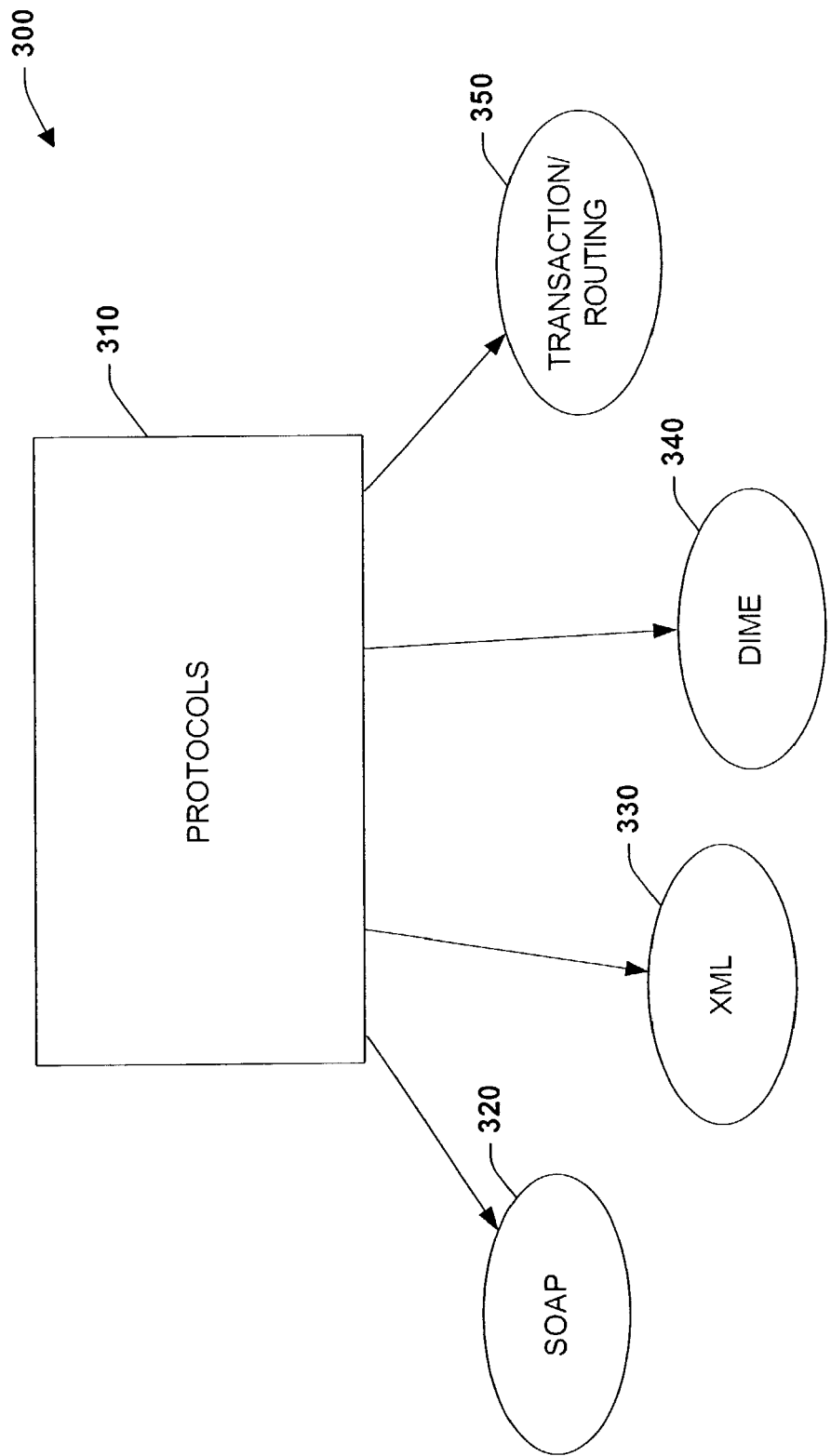
FIG. 3 is a diagram illustrating protocols in accordance with one aspect of the present invention.

Referring now to FIG. 3, a protocol component 300 is illustrated in accordance with an aspect of the present invention. The protocol component 300 illustrates example protocols 310 that may be employed with a notification platform in accordance with the present invention. It is to be appreciated that other protocols may be employed. At 320, a Simple Object Access Protocol (SOAP) can be employed as a communications protocol for XML Web services. SOAP is an open specification that defines an XML format for messages between services, wherein XML is illustrated at 330. The specification can include describing how to represent program data as XML 330 and how to utilize SOAP 320 to perform Remote Procedure Calls. These optional parts of the specification are employed to implement Remote Procedure Call (RPC)-style applications, wherein a SOAP message containing a callable function, and the parameters to pass to the function, is sent from a client such as a event source, and a notification server returns a message with the results of the executed function. Most current implementations of SOAP support RPC applications since programmers who are familiar to COM or CORBA applications understand the RPC style. SOAP also supports document style applications whereby the SOAP message is provided as a wrapper around an XML document. Document-style SOAP applications are very flexible, wherein a notification system XML Web service can take advantage of this flexibility to build services that may be difficult to implement with RPC.

Other parts of the SOAP specification define what an HTTP message that contains a SOAP message may appear as. HTTP binding can be important because HTTP is supported by almost all current operating systems. HTTP binding is optional, but almost all SOAP implementations support it as one possible standardized protocol for SOAP. For this reason, there's a common misconception that SOAP requires HTTP. Some implementations support MSMQ, MQ Series, SMTP, or TCP/IP transports, but almost all current XML Web services employ HTTP because it is ubiquitous. Since HTTP is a core protocol of the Web, most organizations have a network infrastructure that supports HTTP. Security, monitoring, and load-balancing infrastructure for HTTP are also readily available. It is to be appreciated that commercially available tools can be employed to construct SOAP messages directly. This can include a SOAP toolkit to create and parse SOAP messages. These toolkits generally translate function calls from a computer language to a SOAP message. For example, a Microsoft SOAP Toolkit 2.0 translates COM function calls to SOAP and an Apache Toolkit translates JAVA function calls to SOAP.

Still yet other protocols 310 that may be employed include a Direct Internet Message Encapsulation (DIME) protocol 340 which can be utilized for binary message exchanges in one example of notification platform services. As will be described in more detail below, one or more transaction/routing delivery protocols 350 can be provided to facilitate notification processing and delivery in accordance with the present invention. It is noted that the above protocols can be employed for submitting events, submitting subscriptions, and/or delivering notifications. Also, the protocols 310 can be utilized for internal communications between components in the notifications platform.

Figure 4:
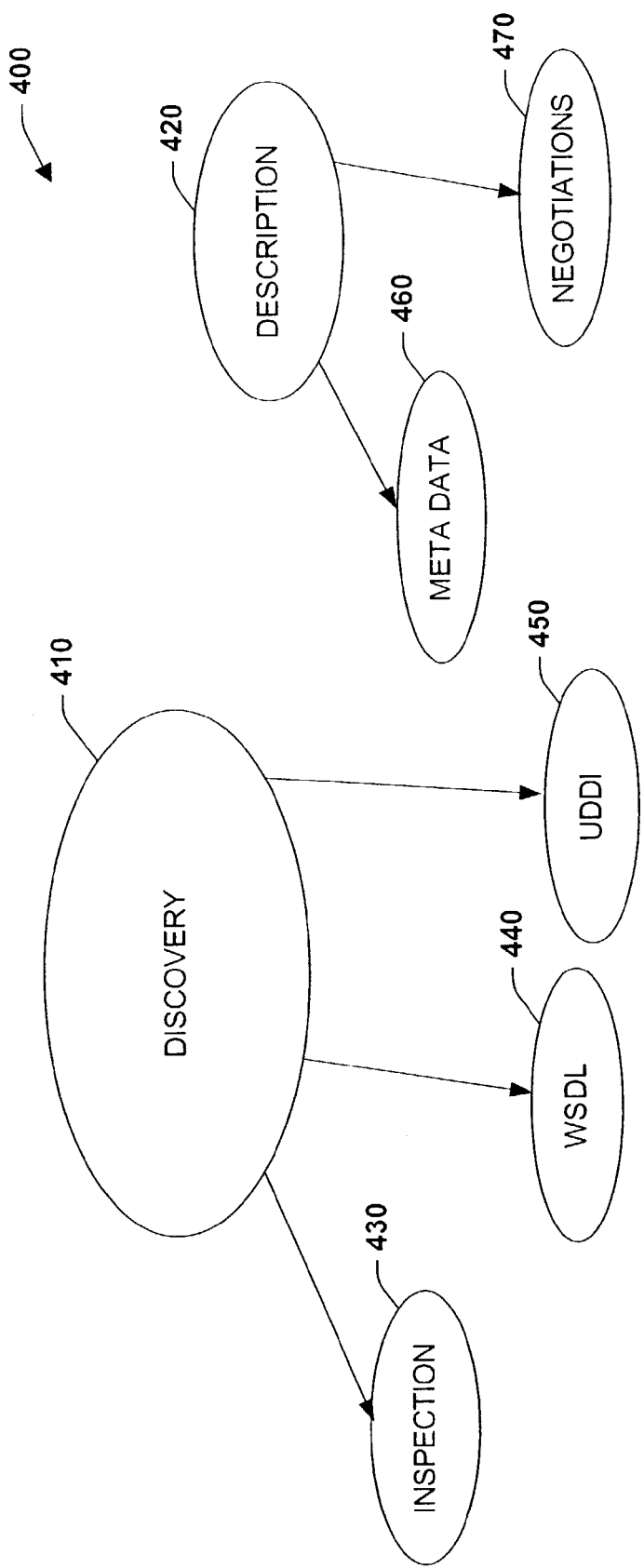
FIG. 4 is a diagram illustrating discovery and description components in accordance with an aspect of the present invention.

Referring to FIG. 4, a diagram 400 illustrates a discovery component 410 and a description component 420 in accordance with an aspect of the present invention. The discovery component 410 includes various aspects that facilitate discovering available notification services. In one aspect, an inspection component 430 can be provided for inspecting a site for available services. The inspection component 430 can include a schema such as the following web services inspection document (WS-Inspection):

<?xml version="1.0"?>
<inspection xmlns="http://schemas.xmlsoap.org/ws/2001/10/inspection/" xmlns:wsiluddi="http://schemas.xmlsoap.org/ws/2001/10/inspection/uddi/">
  <service>
    A stock quote service with two descriptions
    <description referencedNamespace"http://schemas.xmlsoap.org/wsdl/"location="http://example.com/stockquote.wsdl">
    <description referencedNamespace="urn:uddi-org:api">
      <wsiluddi:serviceDescription location="http://www.example.com/uddi/inquiryapi">
        <wsiluddi:serviceKey>4FA28580-5C39-11D5-9FCF-BB3200333F79</wsiluddi:serviceKey>
      </wsiluddi:serviceDescription>
    </description>
  </service>
  <service>
    <description referencedNamespace="http://schemas.xmlsoap.org/wsdl/"location="ftp://anotherexample.com/tools/calculator.wsdl">
  </service>
  <link referencedNamespace="http://schemas.xmlsoap.org/ws/2001/10/inspection/" location="http://example.com/moreservices.wsil">
</inspection>

Another aspect of the discovery component 410 may include a Web Service Description Language (WSDL) illustrated at 440 in order to provide interactions with the notification services. In general, a WSDL file or interface is an XML document that describes a set of SOAP messages and how the messages are exchanged. In other words, WSDL 440 is to SOAP what Interface Description Language (IDL) is to CORBA or COM. Since WSDL is in XML format, it is readable and editable but in most cases, it is generated and consumed by software. WSDL 440 specifies what a request message contains and how the response message will be formatted in unambiguous notation. The notation that a WSDL file utilizes to describe message formats is based on an XML Schema standard which implies it is both programming-language neutral and standards-based which makes it suitable for describing XML Web services interfaces that are accessible from a wide variety of platforms and programming languages. In addition to describing message contents, WSDL defines where the service is available and what communications protocol is employed to communicate to the service. This implies that a given WSDL file defines substantially all matters required to write a program to work with an XML Web service.

In another aspect of the present invention, the discovery component 410 includes a Universal Discovery Description and Integration (UDDI) component 450 that serves as a type of logical "phone" directory (e.g., "yellow pages," "white pages," "green pages") describing notification/Web services. A UDDI directory entry is an XML file that describes a notification system and the services it offers. There are generally three parts to an entry in the UDDI directory. The "white pages" describe the component offering the service:

name, address, and so forth. The "yellow pages" include industrial categories based on standard taxonomies such as the North American Industry Classification System and Standard Industrial Classifications. The "green pages" describe the interface to the service in enough detail for users to write an application to employ the Web service. The manner services are defined is through a UDDI document called a Type Model or tModel. In many cases, the tModel contains a WSDL file that describes a SOAP interface to an XML Web service, but the tModel is generally flexible enough to describe almost any kind of service. The UDDI directory also includes several options to search for the services to build remote applications. For example, searches can be performed for providers of a service in a specified geographic location or for an entity of a specified type. The UDDI directory can then supply information, contacts, links, and technical data to enable determinations of which services to employ in a notification process.

The description component 420 includes components such as meta-data 460 that involve describing various aspects of a notification service. This can include protocols such as WSDL described above providing functional descriptions and include such aspects as negotiations at 470 that involve mechanisms and protocols for negotiating suitable characteristics of message exchange. Such aspects can include security negotiations, authentications, authorizations and the like. Web services protocols such as WS-Policy, WS-Policy Assertions, and WS-Policy Bindings can also be employed. As will be described in more detail below, an Application Definition File (ADF) may be provided to facilitate discovery and/or description of notification services in accordance with the present invention.

Figure 5:
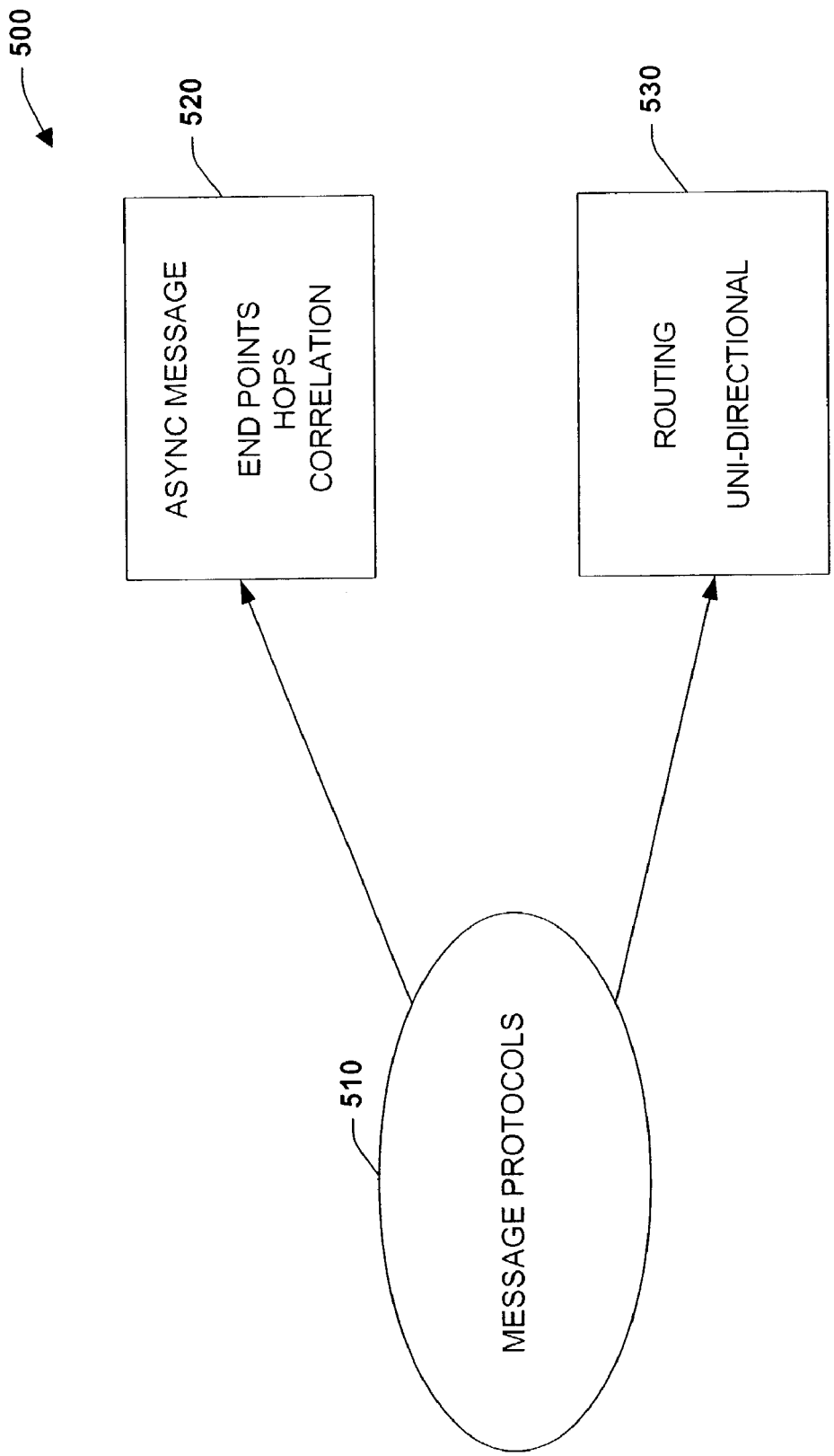
FIG. 5 is a diagram illustrating message protocols in accordance with an aspect of the present invention.

Turning to FIG. 5, a system 500 illustrates asynchronous messaging in accordance with an aspect of the present invention. The system 500 includes one or more message or delivery protocols 510 that facilitate communications within a notification system. In one aspect, the message protocols 510 include an asynchronous message protocol 520. The protocol 520 includes GXA interactivities/communications such as can be defined in a web service AsyncMSG (WS-AsyncMSG). This type of messaging can be defined by an XML SOAP extension, and include such features as end-to-end message information, hop-by-hop message information, and correlation information between messages. Another aspect includes a routing protocol at 530 for sending notifications. The routing protocol 530 includes a web services routing protocol such as WS-Routing which is a protocol for exchanging one-way SOAP messages. WS-Routing is a stateless, SOAP-based protocol for routing SOAP messages in an asynchronous manner over a variety of transports such as TCP, UDP, HTTP and the like. With WS-Routing, the entire message path for a SOAP message (as well as its return path) can be described directly within the SOAP envelope. It supports one-way messaging, two-way messaging such as request/response and peer-to-peer conversations, and long running dialogs. The Web Services Routing Protocol (WS-Routing) also defines mechanisms for routing SOAP messages. SOAP is a lightweight wire protocol that defines a serialization mechanism to transport method calls to be used in application layer protocols. SOAP does not actually define a mechanism for sending a message from one party to another, even though it refers to a virtual message path. WS-Routing (formerly known as SOAP-RP) is a stateless protocol that extends SOAP by defining a mechanism to specify an ordered route, or path, from the originator of the message, through intermediaries, to the ultimate message receiver. The following schema illustrates an example WS-Routing message:

```
<S:Envelope        xmlns:S="http://www.w3.org/2002/06/
soap-envelope">
  <S:Header>
    <m:Path    xmlns:m="http://schemas.xmlsoap.org/ws/
       2002/05/routing"
    S:mustUnderstand="true"
    S:role="http://www.w3.org/2002/06/soap-envelope/
       role/next">
      <m:Action>http://example.org/notify/update</m:
         Action>
      <m:Fwd>
        <m:Via>soap://firewall.example.com/henrik</m:
           Via>
        <m:Via>soap://example.org/notification</m:Via>
      </m:Fwd>
      <m:Rev>
        <m:Via>soap://internal.example.com/my/end-
           point</m:Via>
      </m:Rev>
    </m:Path>
  </S:Header>
  <S:Body>
  </S:Body>
</S: Envelope>
```

Figure 6:
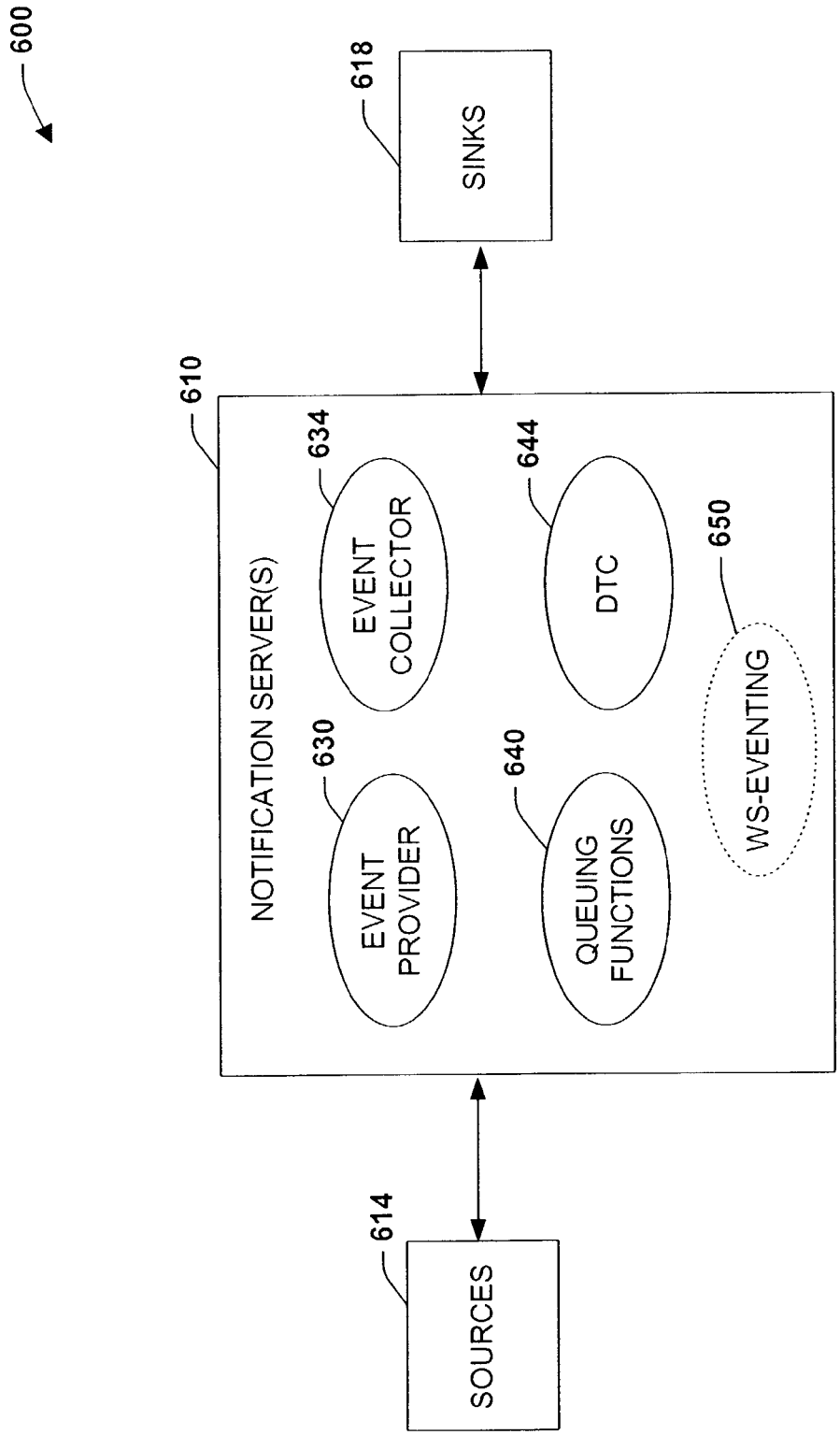
FIG. 6 is a diagram illustrating notification server functionality in accordance with an aspect of the present invention.

FIG. 6 illustrates a system 600 for reliable messaging and transactions in accordance with an aspect of the present invention. The system 600 includes one or more notification servers 610 that distribute information generated from notification sources 614 to notifications sinks 618 which are described in more detail below. The notification server 610 includes various functions and operating processes to facilitate delivery of notifications from the sources 614 to the sinks 618. An event provider 630 and event collector can be provided with the notification server 610 to facilitate reliable message or notification delivery. Other components include a queuing component 640 and a Distributed Transaction Coordinator 644. In an alternative aspect, a WS-Eventing component 650 can be employed to facilitate subscribing to a notification service via a subscription event, and then be employed to deliver notifications for the respective subscriptions to a WS-Eventing-aware recipient. Eventing protocols are described in more detail below with respect to FIG. 11.

The queuing component 640 can be provided as part of a commercially available component such a Microsoft Message Queue (MSMQ) to process notification transactions by composing individual send or receive operations in a single transaction, if desired. If a smaller transaction fails, then a rollback to the last consistent state requires less work from the notification server 610. In addition, any successful work already accomplished (through previous small transactions) is preserved. A succession of smaller transactions can be conducted asynchronously and then connected employing message queues. Sending and receiving messages/notifications typically involves the following operations:

Client adds a message to a queue, perhaps updating a local database. This work is the first transaction.

Queue manager (not shown) moves the message from the client computer to the server queue. The queue manager typically receives one copy.

Server gets the client's message from the queue, processes the request, and adds a message to a client response queue. This is the second transaction.

Client retrieves its response message. This is the third transaction.

This implies that transactions can occur independently. If the client's first transaction commits successfully, then the message is stored in an input queue (not shown). If the server transaction fails, the transaction rolls back to its last consistent state which indicates that the client's message is still in the input queue. MSMQ can also participate in existing Microsoft Transaction Server (MTS) transactions as a resource manager, for example. In a distributed environment, an application (e.g., application to receive notifications and send notifications to sinks) generally partitions its work among multiple components. In order to coordinate activities from these components, MTS and MSMQ can employ a Microsoft Distributed Transaction Coordinator (MS DTC) 644, for example.

MS DTC 644 typically oversees a two-phase commit protocol. Consider an example in which MS DTC is coordinating a two-phase commit with two resource managers, MSMQ and SQL Server™. In the first phase, MS DTC 644 issues a "prepare to commit" message to the MSMQ and SQL Server. The resource managers participating in the transaction make the results of the transaction durable but do not actually commit the transaction. MS DTC 644 then waits for MSMQ and SQL Server to report that they have prepared the transaction before continuing to the second phase of the commit protocol. During the second phase, MS DTC 644 notifies MSMQ and SQL Server to commit their transactions. When the resource managers have reported that they have successfully committed their transactions, then the distributed transaction can be committed.

The system 600 can be employed as part of a reliable message and transaction processor in accordance with the present invention. The Notification Server 610 can be provided as an SQL Server component that supplies event notifications (messages) associated with the sources 614 to a community of subscribers associated with the sinks 618. One example stimulus for event notifications is a message introduced by an application-specific "Event Provider" 630 (another stimulus is the passage of time). These messages can be matched with subscriptions using an SQL query, for example, and a number of notification messages are sent through application and subscription-defined "Delivery channels" to the subscriber.

When a message is handed off from the message source 614 to the message sink 618, an intuitive expectation is that this message is given to the recipient one time. However, when systems or parts of systems fail, it is sometimes difficult to determine whether or not the handoff was successful.

A handoff between source 614 and sink 618 may be handled with the following processes:

1) The source realizes that a message needs to be sent.
2) The source calls a method on the sink to present the message.
3) The source marks the message as having been sent or discards it.

Sometimes processes 2 and 3 are interchanged. If there are no failures, it typically doesn't matter. A system can fail (perhaps the power fails) at any time. One of the most difficult problems is a failure somewhere in process 2) above. For example, perhaps the sink didn't get the message. Perhaps it did. Thus, there's nothing in the protocol in 1) through 3) that helps the source to know, at restart, whether or not to send the message again.

Many systems (e.g., most e-mail systems) handle this problem by sending the message again if an acknowledgement from the sink has not been received. There is the potential for a duplicate message to be introduced by the message source during restart. The source doesn't know that the sink didn't get the message, so it's sent again. The end user might receive a duplicate e-mail message on occasion, but often that's not a problem if it doesn't happen too frequently. This restart protocol results in what is often called "at least once message delivery." Messages aren't lost, but they may be duplicated.

An alternative protocol, which can happen when processes 2) and 3) above are interchanged, is sometimes called "at most once message delivery", meaning that duplicate messages will not be introduced, but some messages may be lost. Message loss can occur when the source 614 marks the message as having been sent before the sink 618 has durably received the message. This "at most once" protocol is actually quite sufficient in many cases. The loss of an occasional message is not always significant, or the interested party can be depended upon to ask for lost data again. Thus, it may be too much trouble to expend the computational effort or introduce the acknowledgement message flows.

There are cases where it's important to try very hard to deliver a message "exactly once." For some applications, it's important to deliver a message exactly once, and if a message cannot be delivered, the source 614 should be reliably informed of the problem. The desired behavior is therefore "exactly once" message delivery. If there are two participants in the message handoff, for example, a source and sink, this protocol can be accomplished by a sequence numbering protocol, wherein the source 614 marks each message with a sequence number that is one larger than its predecessor. The sink 618 checks each message against the expected sequence number and causes an alarm if a message is missing. There is also a way for the sink 614 to inform, the source 618 what message sequence it next expects, and the source is obligated to resend messages that the sink hasn't already acknowledged. During restart, the source 614 may send the in-doubt message again, and the sink 618, using its sequence number, knows whether or not to discard the potentially duplicated message.

In many session-based telecommunications scenarios, these techniques provide a reliable data stream between session partners. TCP/IP uses this technique. However, if a severe disruption to either session partner occurs, such as a power failure, then there's generally no attempt to restart the session at the point of failure. The situation becomes more complex when there are more parties involved than a simple message source and sink, and where the "exactly once" message protocol is expected to be observed across session and power outages. For example, an application may receive an input message, update two different databases, and send two output messages. These more complex scenarios may require the use of a third party, a transaction coordinator 644, and each of the individual message and database managers (collectively called Resource Managers) participate in well-studied "two-phase commit" protocols and restart processing.

The following describes possible message processing protocols that may be employed with the present invention. The notification server 610 receives event messages from a customer-supplied Event Provider 630 that calls on the Event Collector component 634. An example Event Provider 630 recognizes files dropped into a directory. After the Event Provider 630 calls the Event Collector 634, the files are renamed so that they are not sent again. The following is an example of the "at least once message delivery" protocol described above.

The Event Collector 634 processes events in "batches." For SQL processing efficiency reasons, a "batch" of events can be processed by one SQL query. For example, a Horoscope system might deposit 12 files into a directory, and the Event Provider 630 might send all twelve messages as one Event Batch. The Event Provider 630 typically calls a "Write" method once for each message in the event batch, and calls a "Flush" method to end the hatch, which are described in more detail below. If the Event Provider 630 does not proceed to calling "Flush", event messages are not processed and are eventually discarded by the Event Collector 634.

In this protocol, there is generally no sequence numbering mechanism or query mechanism that would permit the Event Provider 630 to query if a particular message or batch of messages was completely received. If, for example, power failed during the Flush method call, the Event Provider 630 has no way to determine if the Flush did or did not complete. Therefore, the Event Provider 630 typically must reintroduce the batch. If Flush did complete, then all the messages in the event batch are duplicated.

The following is a pseudocode example for the Event Collector Write method:
1) If an event batch has not been started, begin a new database transaction and insert a row into a "batch header" table.
2) Insert a new "event" row to another event-specific table.

The following is a pseudocode example for the Event Collector Flush method:
1) Update the "batch header" row inserted by the first Write to indicate that the batch is complete.
2) Commit or abort the database transaction, depending on a parameter value.

FIGS. 7-10 illustrate methodologies for reliable message processing in accordance with the present invention. While, for purposes of simplicity of explanation, the methodologies are shown and described as a series of acts, it is to be understood and appreciated that the present invention is not limited by the order of acts, as some acts may; in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 7:
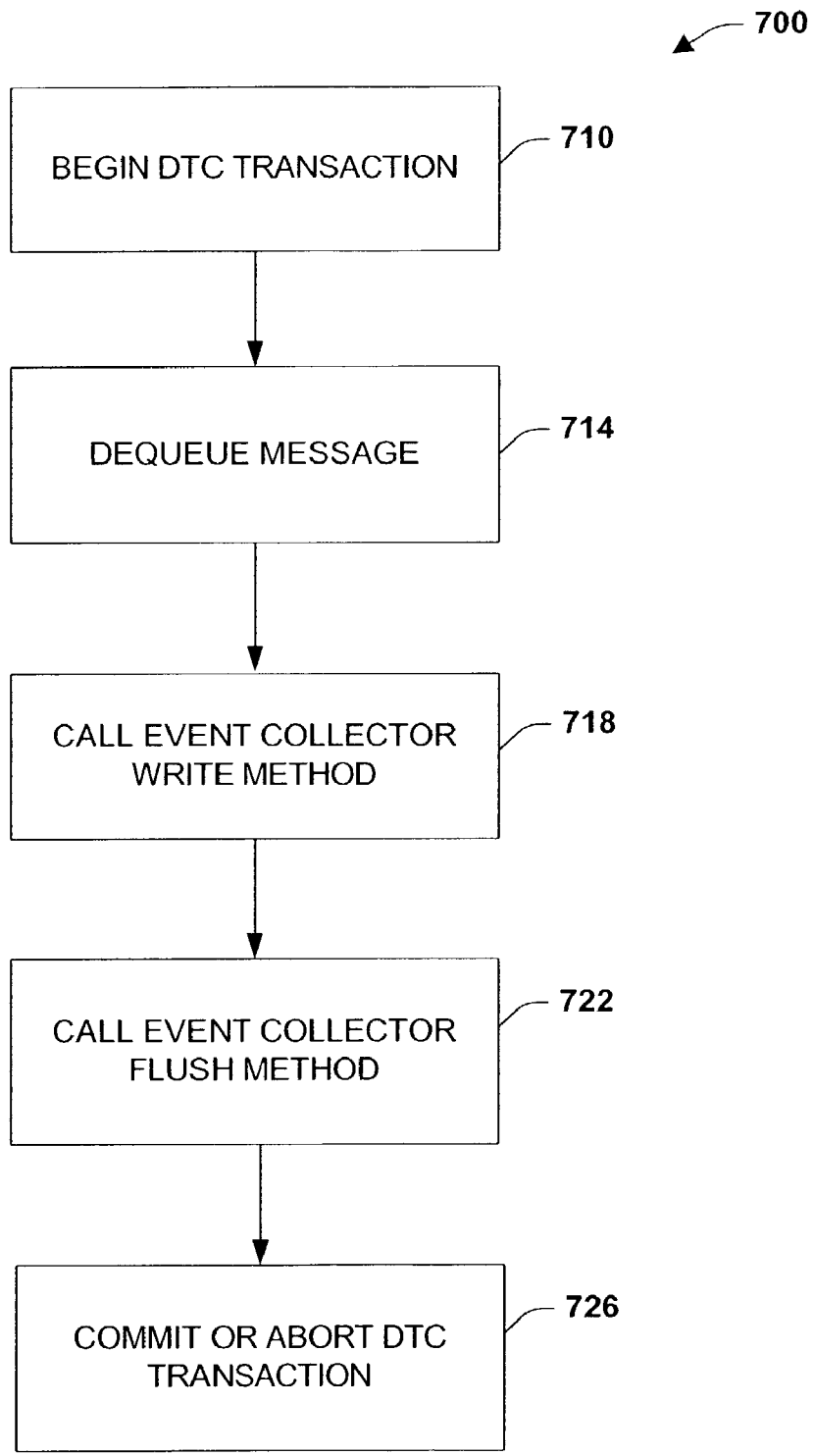
FIGS. 7-10 illustrate reliable messaging protocols and transactions in accordance with an aspect of the present invention.

FIG. 7 illustrates a process 700 for an "exactly once" Event Provider in accordance with the present invention. Proceeding to 710, a DTC transaction is started. For each message in a batch, a message is received or de-queued at 714, wherein a call is made to an Event Collector's "Write" method at 718 which is described below. At 722, a call is made to an Event Collector's "Flush" method (described below) with a "Commit" or "Abort" parameter. At 726, a commit or abort is initiated with the DTC transaction at 710. The Event Collector typically needs to be able to selectively participate in a DTC transaction. In order to determine if it is in a transaction, the Event Collector should inherit from a .NET Frameworks ServicedComponent base class, for example. It can then employ a ContextUtil "IsInTransaction" method to determine if the caller has started a DTC transaction.

Figure 8:
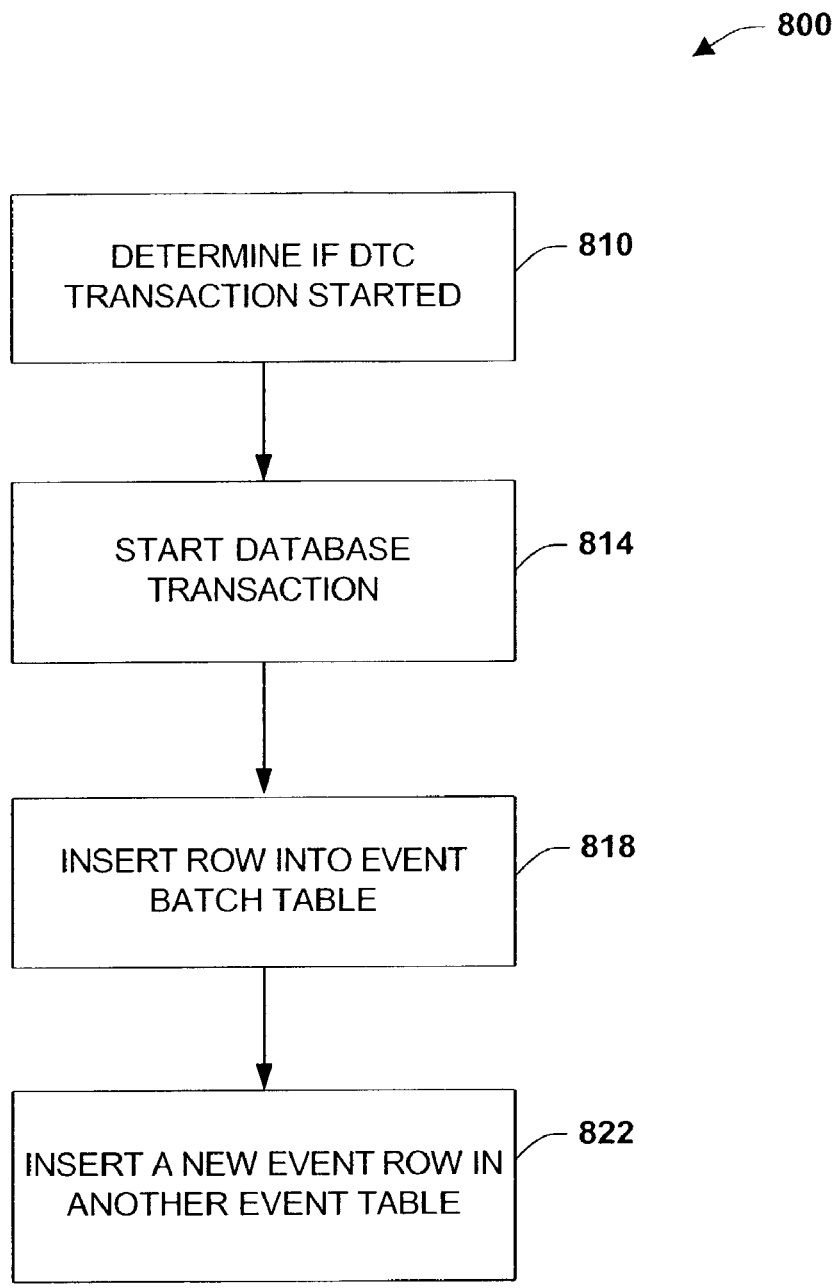

FIG. 8 illustrates an Event Collector "Write" process 800 in accordance with an aspect of the present invention. It is noted that acts 810 though 818 may be executed upon receipt of a first message in a queue whereas, act 822 may be executed if previous messages have already been submitted to a batch for processing. At 810, if a first message is received in an Event Batch, then the process 800 determines and remembers if a DTC transaction has been started (e.g., IsInTransaction). If not, a Database transaction is started at 814. At 818, the process 800 inserts a row into an "Event Batch" table. If the message received at 810 is not the first message, then the process 800 inserts a new "event row" to another event-specific table at 822 to complete the event collector write method.

Figure 9:
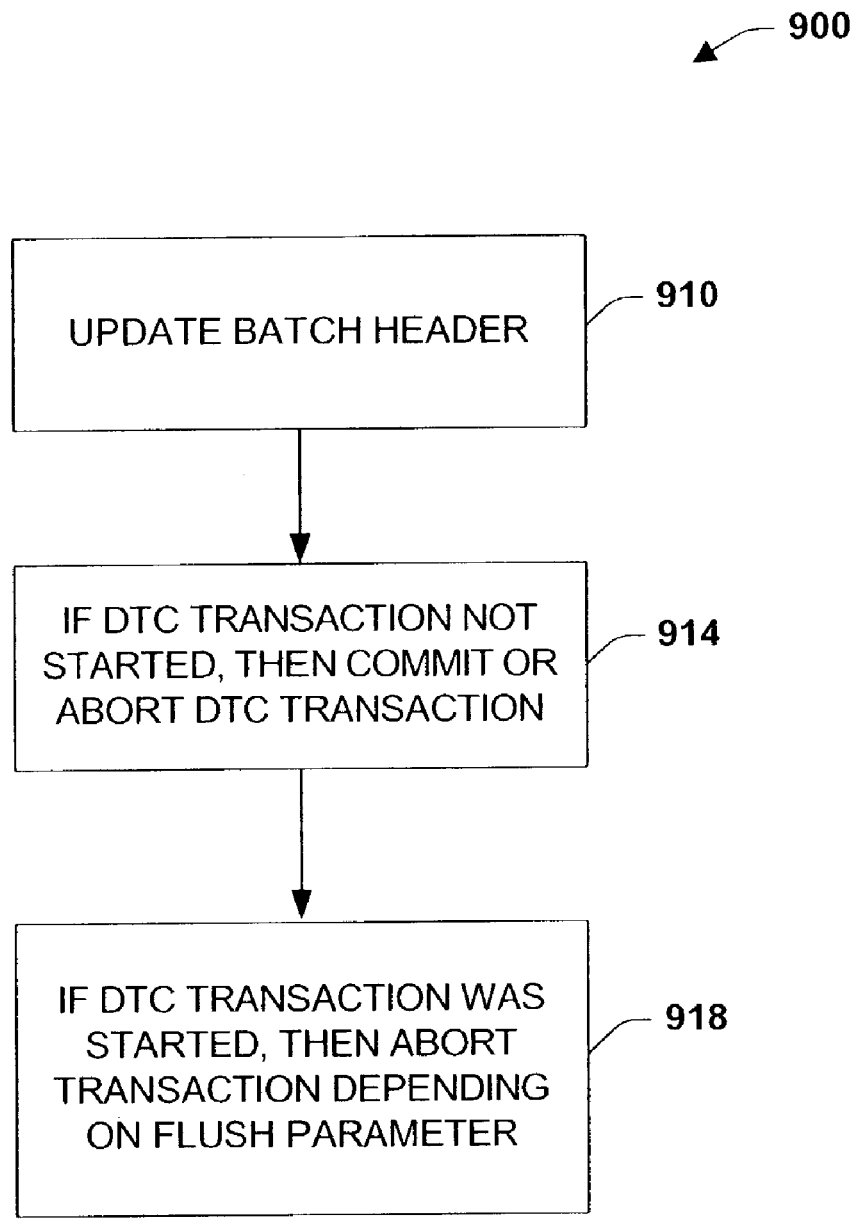

FIG. 9 illustrates an Event Collector "Flush" process 900 in accordance with an aspect of the present invention. At 910, the process 900 updates a "batch header" row inserted by a first Write to indicate that a batch is complete. At 914, if a DTC transaction was NOT started, then the process 900 commits or aborts the respective database transaction, depending on a parameter value. At this point, do not commit the database transaction if presently in a DTC transaction. At 918, if a DTC transaction WAS started, then abort the transaction (e.g., using ContextUtil:MyTransactionVote) if a Flush parameter indicates "discard batch."

Figure 10:
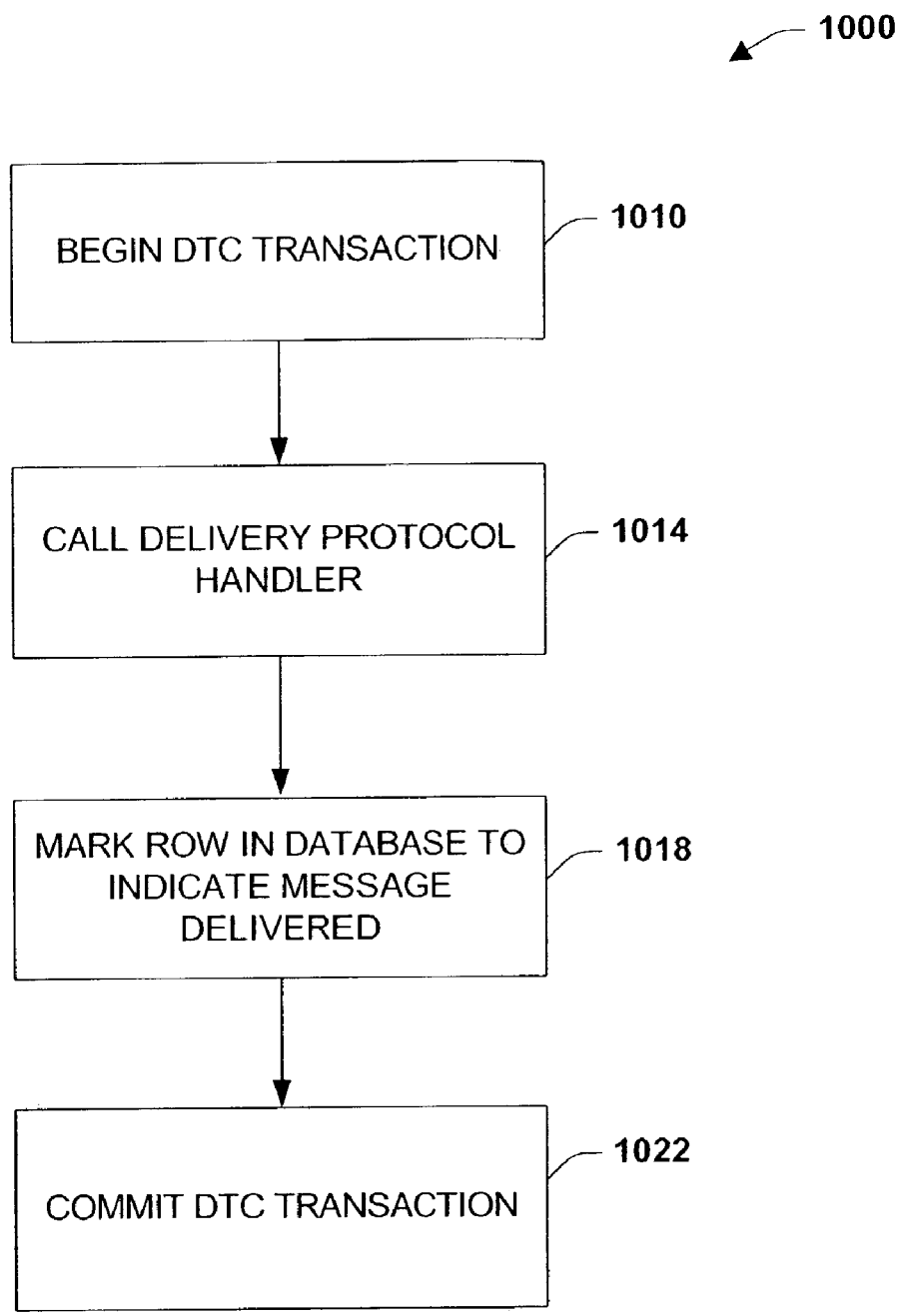

FIG. 10 illustrates a delivery protocol interface and process 1000 in accordance with an aspect of the present invention which can be provided with a notification server having a number of predefined "protocols" which send notifications to subscribers. These protocols can include for example, SMTP (for e-mail), and various SMS and Instant Messaging protocols. An IDeliveryProtocol interface utilizes a "DeliverNotifications" method and a "Flush" method, which is similar to the Event Collector interface described above. If messages are to be given to a reliable channel like MSMQ "exactly once" protocol, then a similar process as the Event Provider may be employed as described above, wherein a distributor component starts a DTC transaction before each "notification batch", performs database updates in that transaction, and commits the transaction at the end of the batch. The distributor component keeps track of a per-message "delivery status", and in the event of a reliable delivery mechanism such as MSMQ, it can be assumed that the message has been delivered if it is accepted by MSMQ. Thus, the following process 1000 can be executed. At 1010, a DTC transaction is begun. For each message in the batch:
    a. Call a delivery protocol handler at 1014 (e.g., DeliverNotifications method).
    b. If that succeeded at 1014, mark a row in a database to indicate that the message has been successfully delivered at 1018.

At 1022, the DTC transaction begun at 1010 is committed. This protocol typically hands off delivery responsibility to MSMQ. However, MSMQ can accept a message for delivery, and then later discover that it cannot deliver the message, and can generate a status message indicating that the message has been abandoned. Fully robust handling of MSMQ delivery may require that the distributor component incorporates a full MSMQ acknowledgement protocol and the associated delivery status values which may be achieved by adding a Boolean "UseDICTransactions" Protocol property that informs the distributor component to utilize this process for each batch.

Figure 11:
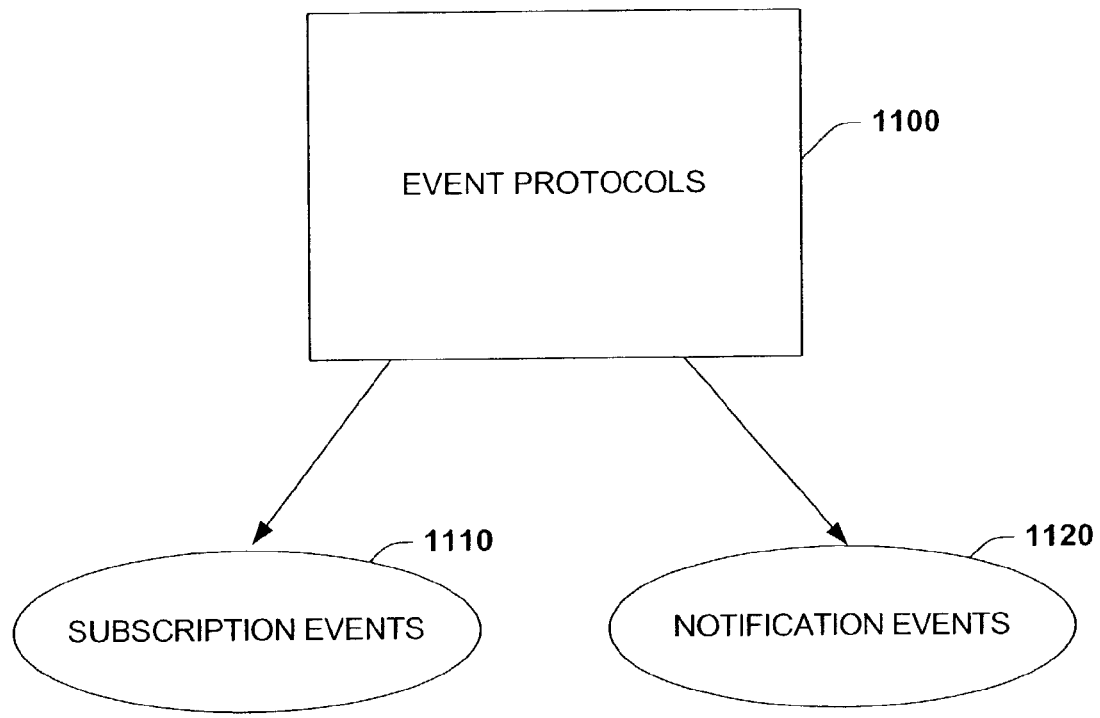
FIG. 11 is a diagram illustrating event protocols in accordance with an aspect of the present invention.

FIG. 11 illustrates possible event protocols 1100 that may be provided in accordance with an aspect of the present invention. The event protocols 1100 can include a SOAP-based protocols for subscribing to event sources and receiving notifications there from such as provided by a WS-Eventing protocol/component described above, for example. Event sources typically define topics for respective notifications and are identified by an address such as a Universal Resource Locator (URL). At 1110, a subscribe event can be provided, wherein a subscriber sends a subscribe message to a topic URL, wherein such message can specify a listener URL to which notifications should be sent. The following schema illustrates an example subscribe message:

<SOAP:Envelope
      xmlns="http://schemas.xmlsoap.org/ws/2001/10/wsevent/"

```
xmlns:RP="http://schemas.xmlsoap.org/rp/"
xmlns:SOAP="http://schemas.xmlsoap.org/soap/envelope/">
<SOAP:Header>
    <RP:path>
        <RP:to>soap://printer-1.corp.com/paper-out</RP:to>
        <RP:from>soap://workstation-1.corp.com/printer-monitor</RP:from>
<RP:action>http://schemas.xmlsoap.org/ws/2001/10/wsevent/subscribe</RP:action>
    <RP:id>uuid: lkj31j3-1234-1324-1111</RP:id>
    </RP:path>
    </SOAP:Header>
    <SOAP:Body>
    <subscribe>
        <notifyTo>soap://workstation-1.corp.com/printer-monitor/paper-status</notifyTo>
        <expiresAt>20380119T031407Z</expiresAt>
    </subscribe>
    </SOAP:Body>
    </SOAP:Envelope>
```

After a subscription has been obtained, one or more notification events 1120 may be provided when notifications from the subscriptions become available. This can include the above described event sources sending a notify message having a respective notification contained therein. The following schema illustrates an example notify message:

```
<SOAP:Envelope
    xmlns="http://schemas.xmlsoap.org/ws/2001/10/wsevent/"
    xmlns:RP="http://schemas.xmlsoap.org/rp/"
    xmlns:SOAP="http://schemas.xmlsoap.org/soap/envelope/">
<SOAP:Header>
    <RP:path>
        <RP:to>soap://workstation-1.corp.com/printer-monitor/paper-status</RP:to>
        <RP:from>soap://printer-1.corp.com/ens</RP:from>
<RP:action>http://schemas.xmlsoap.org/ws/2001/10/wsevent/notify</RP:action>
    <RP:id>uuid:lkj31j3-1234-1324-3333</RP:id>
    </RP:path>
    <notify>
    <hopCount>0</hopCount>
    </notify>
    </SOAP:Header>
    <SOAP:Body>
    <!--Application Specific Payload-->
    </SOAP:Body>
    </SOAP:Envelope>
```

Figure 12:
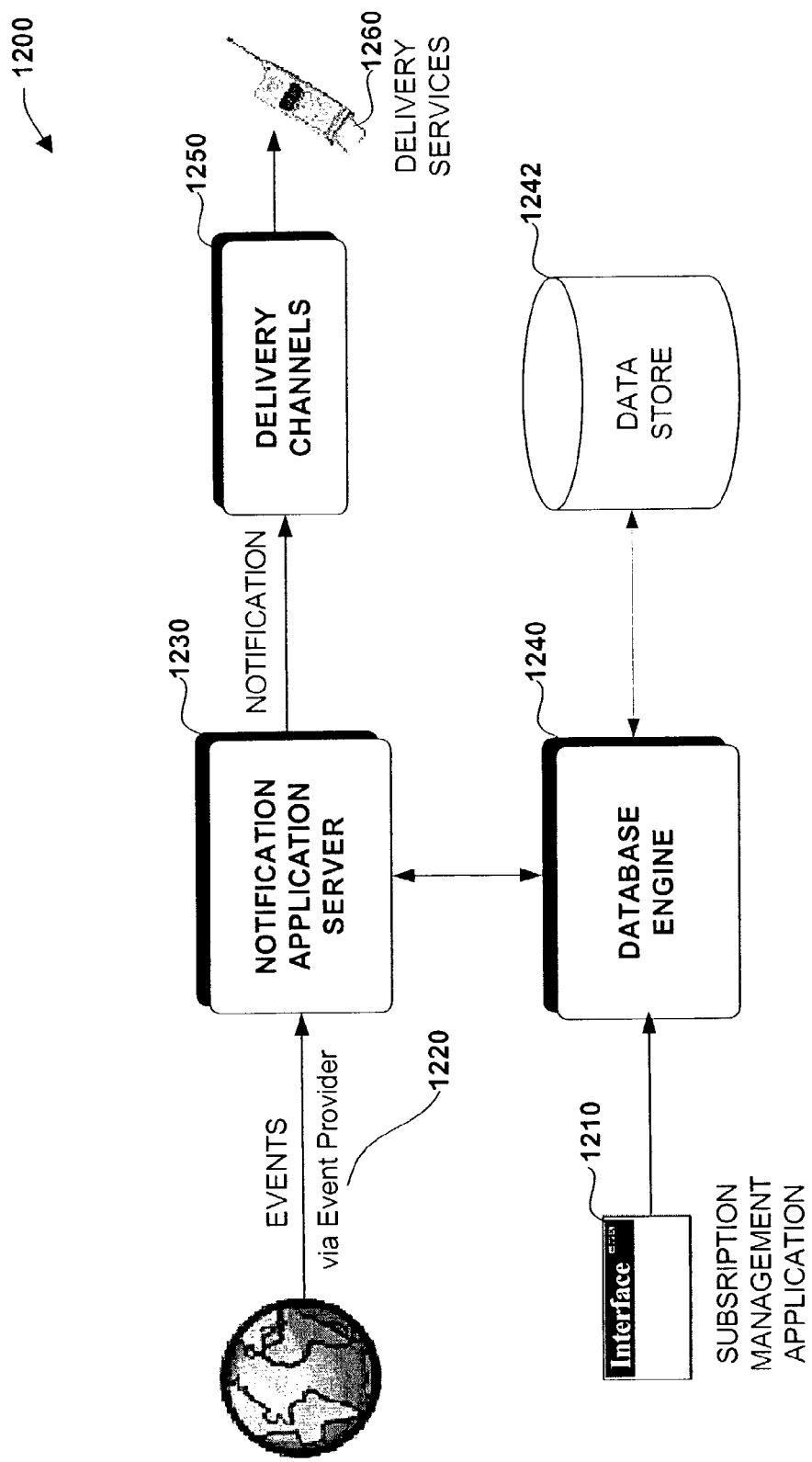
FIG. 12 is schematic block diagram of a notification application architecture in accordance with an aspect of the present invention.

Referring to FIG. 12, a system 1200 illustrates a notification application architecture in accordance with one aspect of the present invention. The notification system 1200 facilitates delivery of information to entities that have subscribed to an application. The system 1200 provides for high-scalability and affords for disseminating information to subscribers in a desired manner according to specific subscriber preferences. A subscriber is an entity (e.g., a person or application) that has subscribed to the notification system 1200. A subscription in accordance with the present invention can be an expressed interest in certain information (e.g., stock price or results of a sporting event), and the specification of a delivery mode (e.g., e-mail, voice mail, delivery via PDA, desktop computer, cellular telephone, television . . . ). Moreover, the present invention also provides for taking into consideration an individual's present state and associated delivery preferences according to present state. Thus, the notification system provides for dynamically modifying deliver modes given the type of information' to be delivered, the criticality associated with the information, the subscriber's present state, and the deliver preferences given the aforementioned other parameters. One aspect of the invention that facilitates the system 1200 providing such highly scalable notification services is the employment of modeling subscriptions as data. Such subscription modeling mitigates the need to run queries individually per event per subscriber. Accordingly, numerous events can be concurrently processed with respect to a plurality of subscribers and relevant notifications provided to the respective subscribers in a meaningful manner in accordance with individual subscriber preferences.

Information that subscribers are interested in is collected as events. For example, a stock price at a specific time can be an event, as is a sports score, or a product delivery message—almost any suitable real world "happening" can be expressed as one or more events in accordance with the subject invention. A notification is a message delivered to a subscriber-specific device that contains information related to a subscription. A notification might contain a message about a new high value for a specific stock or the final score for a sporting event for example. The server notification services provide interfaces for gathering subscriptions and events, and then produces notifications based on this data.

Instead of treating individual subscriptions as queries, the notification system 1200 treats individual subscriptions as parameter data (e.g., an application developer can define a set of parameterized queries, each of which can be a subscription class)-evaluation of large numbers of subscriptions becomes a set-oriented data processing problem, for which database engines (e.g., SQL server) are well suited. This is a foundation of the notification system-programming framework of the present invention. In this model, event-triggered subscriptions are evaluated by simply executing a database join between events and a potentially large set of subscriptions. In general, the notion of modeling subscriptions as data is based on an assumption that if the notification system 1200 defines various domains, then many queries will have a common structure. For instance, many subscribers are interested in stock values, but at a finer granularity respective subscribers desire information about different stocks at different values. Thus, an interest in a particular stock can be expressed as "STOCKSYMBOL" and "TRIGGERPRICE" so as to provide a common framework or parameter(s) for such information. The semantics of how these parameter values are interpreted in relation to the event data can be are defined by the application. Thus, the application fixes the logic of how subscription parameters are interpreted (e.g., one app may want to alert when current price>trigger price and another may want to alert when current price<trigger price)—such semantics can be resolved in advance by the application developer, and designed such that a subscriber cannot introduce new semantics.

As discussed in greater detail below, the subject invention also encompasses a programming model for building subscription applications. In subscription applications a user establishes subscriptions or declarations of interest in certain kinds of targeted information. Thereafter, when the information becomes available, the subscription application sends a notification to the subscriber. A function of a subscription application is to match incoming data with the set of user subscriptions to determine what notifications need to be delivered. The subject programming model allows an application developer to write a small amount of application specific code (e.g. a mix of XML, SQL, C#, C++, VB and other languages suitable for support by the .NET framework) to build a fully-functional, rich subscription application. To enable such functionality, an execution engine can be built on top of SQL Server and the .NET frameworks, for example, that implements fundamental data constructs and execution semantics common to subscription applications. Thus, the subject programming model reduces development time facilitates application maintenance and increases application efficiency by leveraging the power of a server, for instance SQL Server, to do subscription and event matching.

The subject invention includes a declarative programming model for building subscription applications. The programming model provides a base framework for the structure of applications; and a developer can adapt the base framework to build a specific application.

With respect to the high-level schematic illustration of the system 1200, five components of notification services cooperate to provide the functionality described above. A subscription management application 1210 provides an interface for subscribers to submit subscriptions as input to the system 1200. In particular, the subscription management application 1210 provides numerous application programmer interfaces (APIs) that facilitate entities to provide subscription services via the system 1200—the APIs are discussed in greater detail infra. Event data can also gathered from external sources via an event provider 1220. For example, an event provider in accordance with the present invention can gather or be pushed relevant events from a plurality of resources (e.g., newspapers, magazines, websites, libraries, individuals, employers, government(s), etc.). A database engine 1240 stores events and/or subscriptions in a data store 1242, and also runs statements, like Transact-SQL statements, and stored procedures. It is to be appreciated that the database engine 1240 can also process events versus subscriptions in real-time without persistently storing information. A notification application server 1230 processes subscriptions based on a set of events and ultimately generates notifications that are delivered to subscribers, and which can be stored in the database 1242 if desired. Finally, delivery channels 1250 route the generated notifications to delivery services 1260, which can include, but are not limited to, Exchange servers, SMS servers, and .NET Alert Web services.

Figure 13:
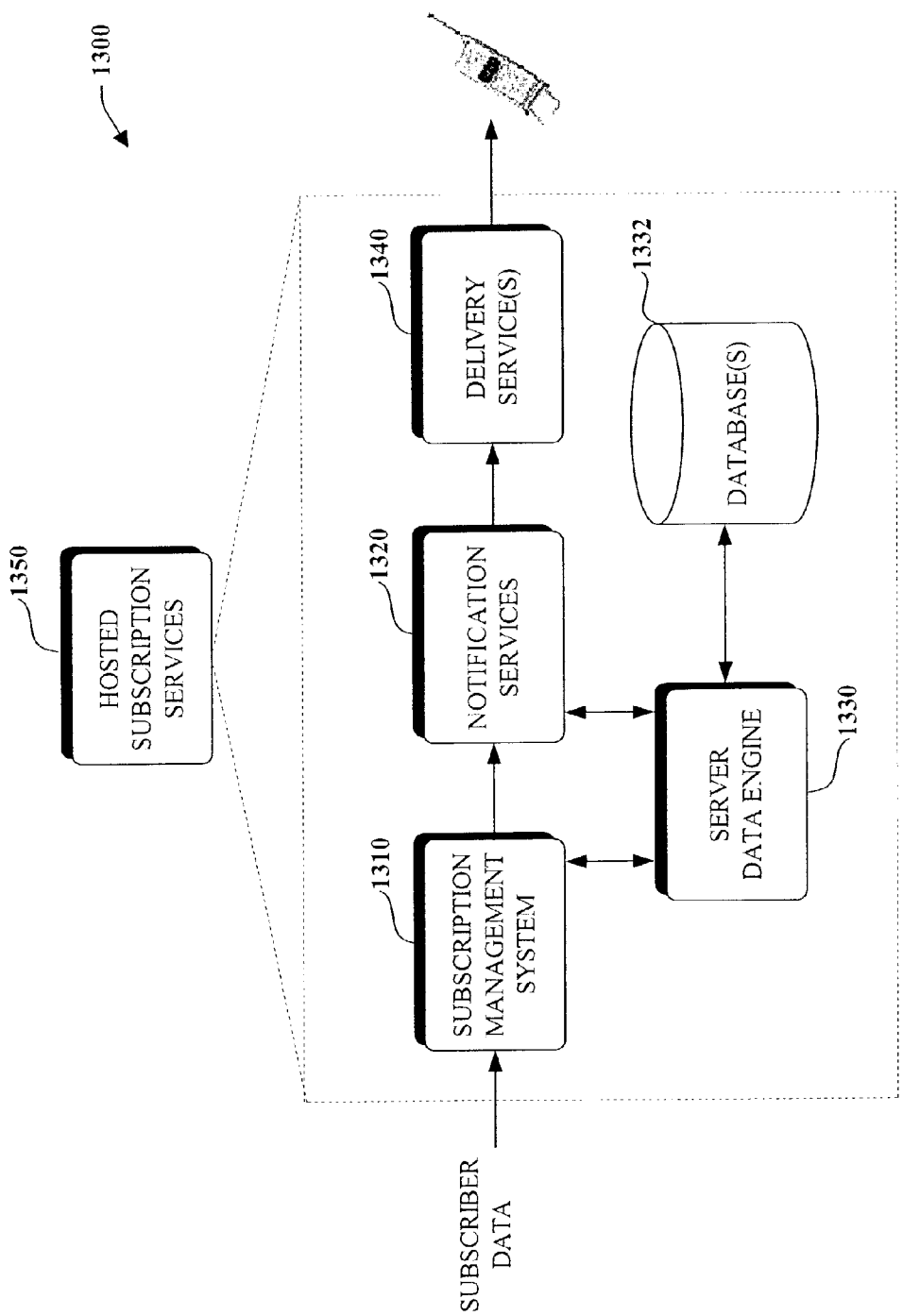
FIG. 13 is a schematic block diagram of a notification creation and distribution system in accordance with an aspect of the present invention.

FIG. 13 illustrates a notification creation and distribution system 1300 in accordance with an aspect of the present invention. The system 1300 includes a subscription management system (one or more subscription management applications) 1310, notification services 1320, a data engine 1330, database(s) 1332, delivery services 1340, and one or more subscription services 1350 hosted by the notification system 1300. The server database engine 1330 provides for processing and storing instance and application data. In particular, the server database engine 1330 stores and retrieves instance and application information from database(s) 1332. The data engine 1330 also provides other services employed by the notification services 1320. For example, the notification services 1320 can employ Transact-SQL language to join event and subscription data via the data engine 1330. Such integration provides scalable performance gains, because the data engine 1330 is likely to be highly optimized for joins as a result of the information processing capabilities afforded by SQL services. The subscription management system 1310, provides a hosting environment for user interfaces that collect subscriber and subscription data as well as accommodate a variety of unique subscription services 1350. The subscription management system can employ a Windows® application for submitting subscriber and subscription data, or can use an automated process for loading subscriber and subscription data from another system. The delivery services 1340 (e.g., .NET Alerts and Microsoft Exchange Server) receive notifications from the notification services 1320 and send the notifications to appropriate subscribers.

Functionally, events are submitted to the server data engine 1330 through a hosted event provider in notification services 1320, or through a non-hosted event provider outside of notification services. If employing a non-hosted event provider, another system may be used that supports the event provider, such as a Web server. In addition, it is appreciated that the notification services 1320 can be deployed on a single server or scaled across multiple servers.

Figure 14:
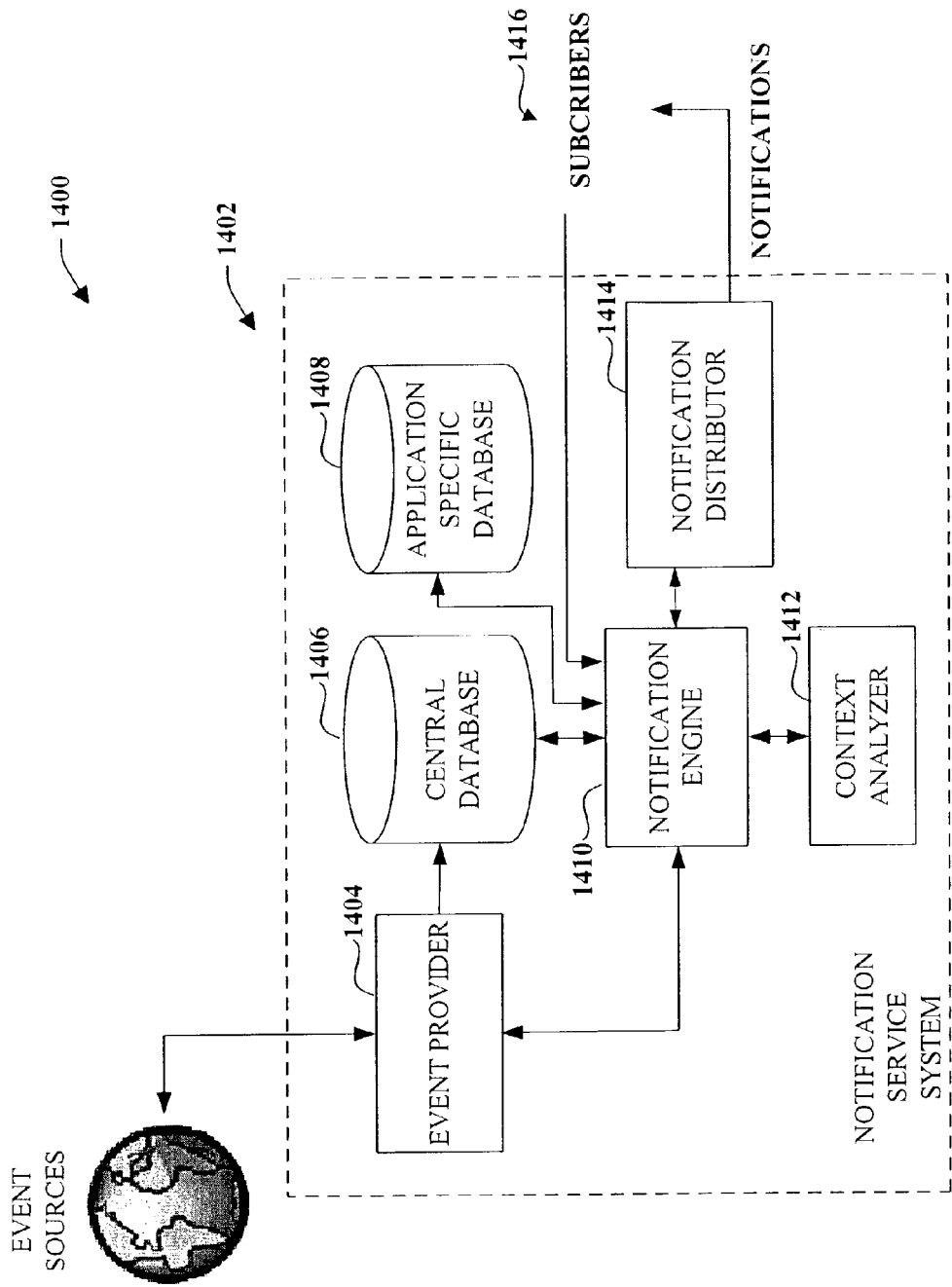
FIG. 14 is a schematic block diagram illustrating a notification service architecture in accordance with an aspect of the present invention.

Referring next to FIG. 14, a notification service architecture 1400 is illustrated in accordance with an aspect of the present invention. The architecture 1400 includes a notification services system 1402, which includes an event provider 1404, a central database 1406, an application-specific database 140g, notification engine 1410, context analyzer 1412, notification distributor 1414, and subscribers 1416. The notification services system 1402 receives input in the form of events and subscriber data, and supplies output or notification to subscribers 1416.

The event provider 1404 acquires events from event sources for the notification services system 1402. Events represent data changes in the external world. For example, a stock price at a specific time is an event, as is a sports score, or a product delivery message. Stated differently, events are items that are potentially interesting to some set of users, and such set of users define the particular input data via subscriptions. The event provider 1404 is employed to collect selected events from event sources for the notification services 1402. Moreover, the event provider 1404 can collect event data from a plurality of different sources including but not limited to communications, such as Internet and network-based communications, and telephony communications, as well as software services, XML files, applications, and databases.

Event sources are defined generally herein as that which generates events, which can also be referred to as notifications or alerts, intended to alert a user, or a proxy for the user, about information, services, and/or a system or world event. An event source can also be referred to as a notification source. Furthermore, the event provider 1404 can monitor and gather data through various methods. Exemplary methods of gathering data include but are not limited to, monitoring directories for file additions, checking system and application log files for certain types of entries, trapping alerts from applications, monitoring web pages, tracking changes in database tables, and reviewing data provided by web services. In most cases, an event provider can gather data from any suitable resource, provided that an application is prepared that retrieves events from the resource. In general, there are a variety of different models that can be employed by the event provider 1404 to collect data. These models can influence how often and under what circumstances the event provider 1404 will collect events from event sources.

In addition, the event provider 1404 can be notified or provided with data in at least one of two manners. The event provider 1404 may wait for information to be "pushed" or sent to it, or it can "pull" information from a source by polling the source and gathering any new or updated data. For example, if a user desires to be notified each time a headline story on a favorite news page changes, the event provider 1404 can be implemented so that it monitors that page and searches for changes to the headline text, for example. When the text changes, the event provider 1404 can extract the new headline data for the notification services system 1402. In the above example, the event provider 1404 is responsible for gathering needed data, because the data is not provided to the event provider from the event source as would be the case with employment of a push methodology.

Furthermore, the event provider 1404 can obtain new data for the notification system 1402 based on either a schedule or on the occurrence of an event that meets pre-defined criteria. A scheduled event provider can run periodically, based on settings implemented by an application developer. The scheduled event provider will start running, retrieve and submit new event data and then hibernate until a next scheduled trigger time. An event-driven event provider can monitor an event source by running continuously. Thereafter, when data that meets a particular criteria for collection is made available the event provider will collect and submit the event. Alternatively, an event-driven event provider may only run in response to a callback function or some other external stimulus. This external function would then determine whether there is valid event data to collect, and use the event provider as the means of collecting such data. Once the event provider 1404 collects data from an external event source, it writes the data to an event table in batches and saves the event table to database 1408.

Data is preferably handled in batches for the sake of efficiency—event data and notification data are both batched. A batch, as generally defined herein, can be a set of data processed as a group. For example, an event batch can be a set of events that are submitted to notification services 1402 at one time. Events can be written to the system either individually or as a group. When a single event is written to the system and there is not an event batch open, one can be created automatically. The new event and subsequent events are then associated with this automatically created batch. The event provider that is providing these events is programmed to close the current event batch periodically, which submits this batch of events for use in notification generation. A new event batch is then created with the first new event submission, and the cycle starts again. Furthermore, when events are written to the system as a group, each group is automatically assigned an event batch. When the writing process is completed, the event batch is closed so that these events are available for notification generation processes. In one particular embodiment of the invention, the batches are atomic (e.g., either the entire batch or none of it is submitted).

Figure 15:
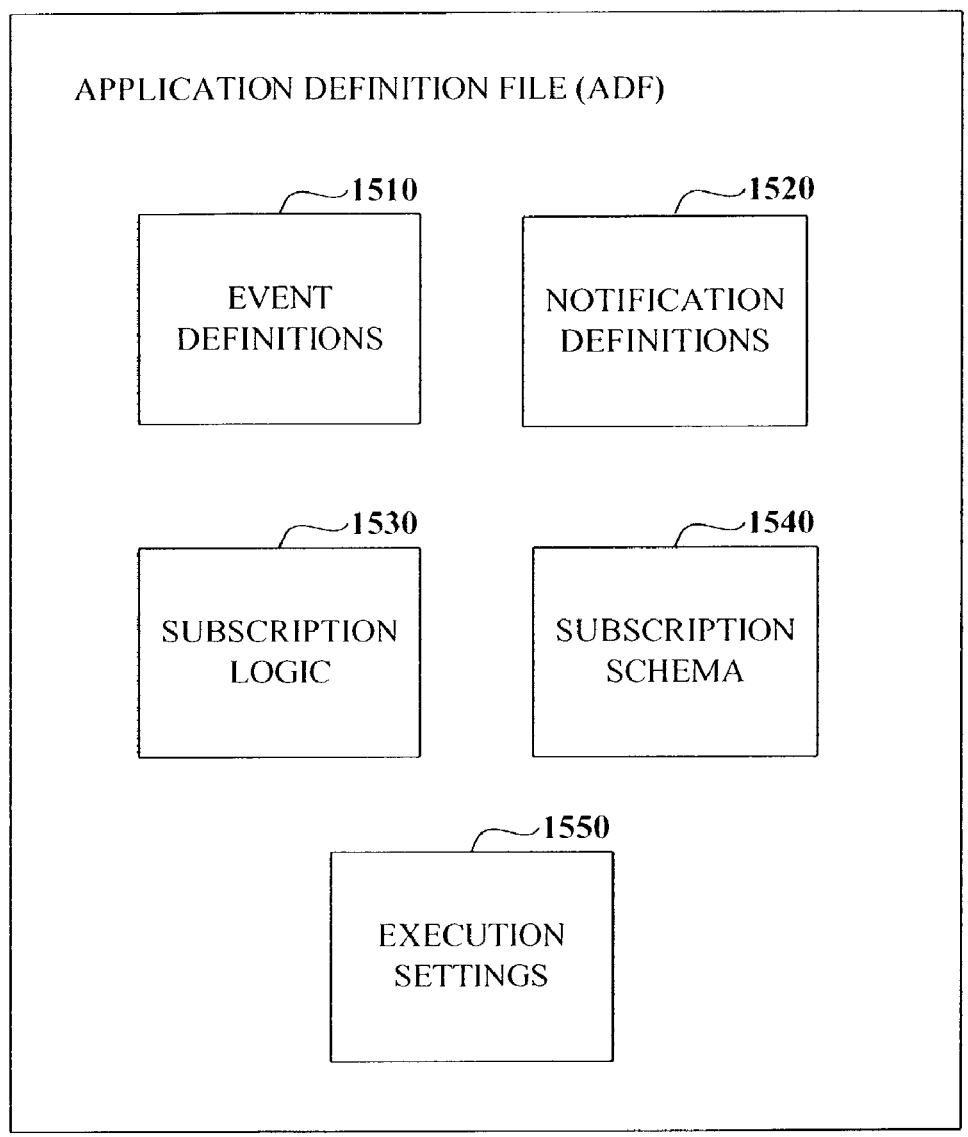
FIG. 15 is a block diagram depicting an ADF and its components in accordance with an aspect of the present invention.

Turning to FIG. 15, a block diagram depicting an ADF 1500 and its components is illustrated in accordance with an aspect of the present invention. The ADF 1500 defines central logic of the application and contains schemas for events, subscriptions, and notifications; the rules for matching events with subscriptions; and may provide the name of the file used to format generated notifications. The ADF 1500 generally includes five components: event definitions 1510, notification definitions 1520, subscription logic 1530, subscription schema 1540 and execution settings 1550. It is to be appreciated that the functionality of the various components can be combined into a lesser number of components or extrapolated into a larger set.

The event definitions 1510 specify structure of event data, the event providers that collect the data, and the structure of any event chronicles used by the application. The notification definitions 1520 specify the structure of raw notification data, the formatting for the messages that will be sent to subscribers, and the delivery protocols used to send the messages. The subscription logic 1530 defines how subscriptions are evaluated. Transact-SQL statements, for example, may match subscriptions to events, or evaluate subscriptions at certain recurring times. Additionally, subscription logic 1530 can be parameterized in a well-defined manner, so that individual subscriptions can personalize the subscription logic. Further, the subscription schema 1540 defines the structure of the subscription parameters, and evaluation times define when subscriptions are to be evaluated. Finally, the execution settings 1550 allow an application developer to enhance behavior and performance of the application when executed by notification services.

Additionally, the application developer may define application settings in several sections of the application definition file (ADF). These settings specify such items as the machines that host notification services, and execution schedules for notification services functions—they also document metadata about the ADF itself. This includes the structure of the events and subscriptions that the application accepts as input, and the structure of the notifications it produces. Examples of such metadata, described in detail below, include but are not limited to generator settings, distributor settings, vacuuming, version settings, notification history, application database information, application executing settings, and distributor information.

The notification services component 1320 (FIG. 13) includes a generator component (not shown) within the notification engine 1410 (FIG. 14) that matches events to subscriptions and ultimately produces notifications. Generator setting considerations may be defined in a <Generator> node in the ADF. One consideration that should be taken into account is how many threads the generator may use to process event batches. Such a factor can be considered a trade-off between improving application speed and monopolizing system resources. Part of such consideration is evaluating how much benefit can be gained by adding more threads. It is appreciated that some operations do not lend themselves to better efficiency through parallelism and may sometimes become less efficient. To indicate this information, a value can be specified for in a <ThreadPoolSize> element in the <Generator> node.

Functionally, the notification services generator attempts to execute event chronicle rules in parallel, followed by subscription rules (both event rules and scheduled rules). The generator will attempt to utilize threads available within the thread pool while executing rules. However, it should be noted that the generator should not execute event chronicle rules in parallel.

Figure 16:
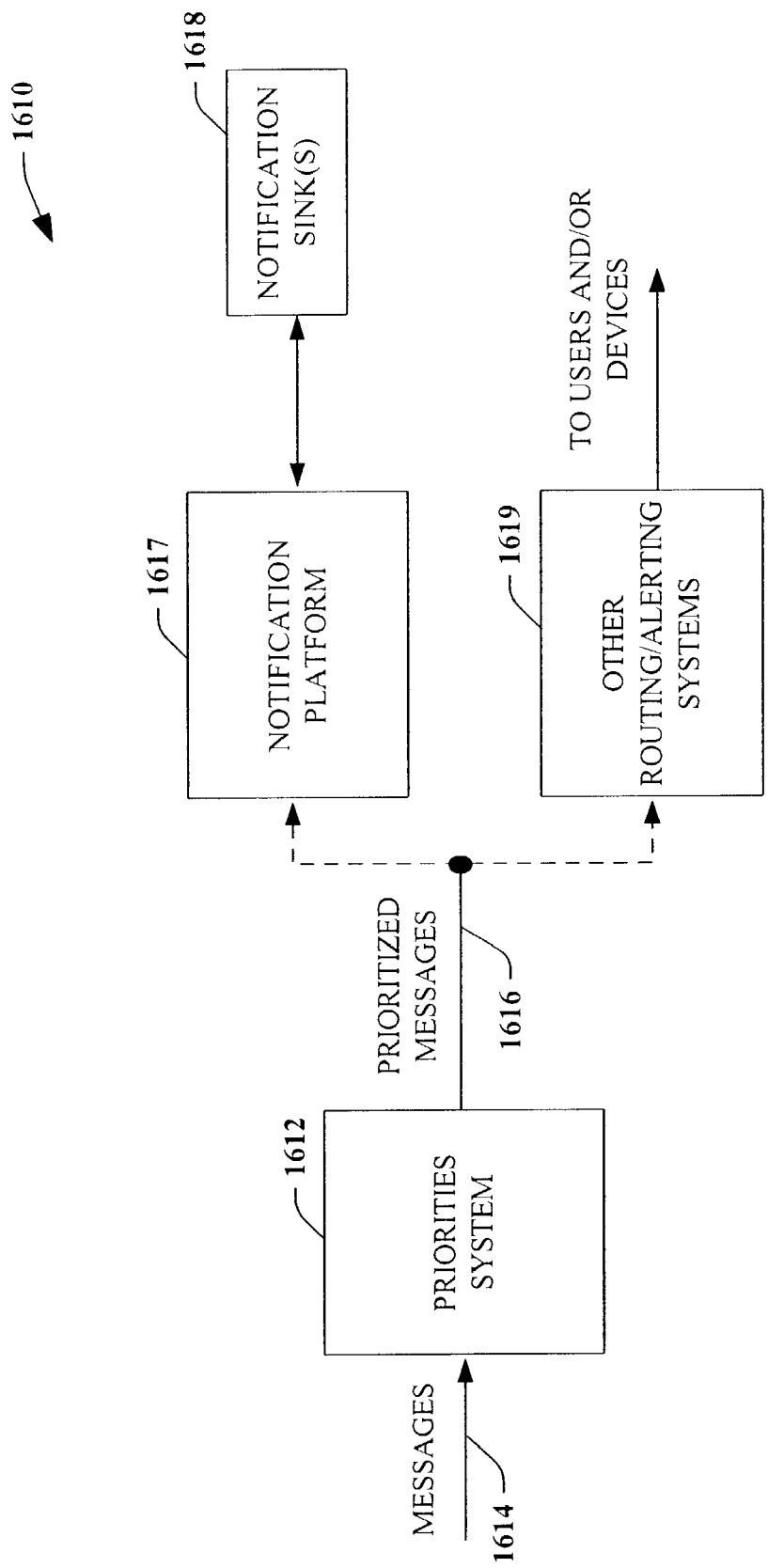
FIG. 16 is a schematic block diagram of a priorities system in accordance with an aspect of the present invention.

Referring to FIG. 16, a system 1610 illustrates a priorities system 1612 and notification architecture in accordance with an aspect of the present invention. The priorities system 1612 receives one or more messages or notifications 1614, generates a priority or measure of importance (e.g., probability value that the message is of a high or low importance) for the associated message, and provides the one or more messages with an associated priority value at an output 1616. As will be described in more detail below, classifiers can be constructed and trained to automatically assign measures of priorities to the messages 1614. For example, the output 1616 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 1617 can be employed in conjunction with the priorities system 1612 to direct prioritized messages to one or more notification sinks accessible to users. As will be described in more detail below, the notification platform 1617 can be adapted to receive the prioritized messages 1616 and make decisions regarding when, where, and how to notify the user, for example. As an example, the notification platform 1617 can determine a communications modality (e.g., current notification sink 1618 of the user such as a cell phone, or Personal Digital Assistant (PDA)) and likely location and/or likely focus of attention of the user. If a high importance e-mail were received, for example, the notification platform 1617 can determine the users location/focus and direct/reformat the message to the notification sink 1618 associated with the user. If a lower priority message 1616 were received, the notification platform 1617 can be configured to leave the e-mail in the user's in-box for later review as desired, for example. As will be described in more detail below, other routing and/or alerting systems 1619 may be utilized to direct prioritized messages 1616 to users and/or other systems.

Figure 17:
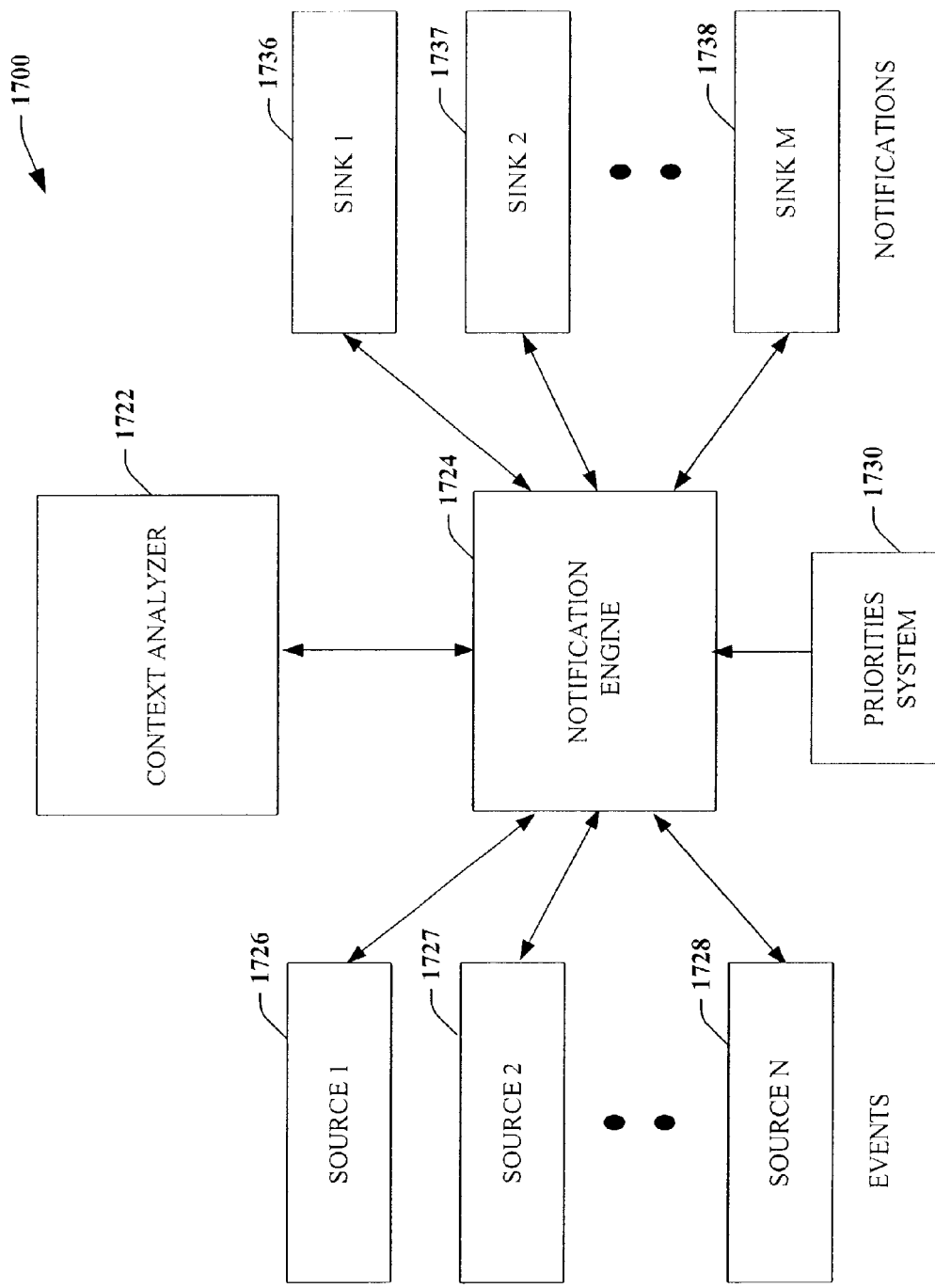
FIG. 17 is a schematic block diagram illustrating systematic cooperation between a notification engine and a context analyzer according to an aspect of the present invention.

Turning now to FIG. 17, a system 1700 illustrates how the notification engine and context analyzer function together according to an aspect of the present invention. The system 1700 includes a context analyzer 1722, a notification engine 1724, one or more notification sources 1 through N, 1726, 1727, 1728, a priorities system 1730, which can operate as a notification source, and one or more notification sinks, 1 through M, 1736, 1737, 1738, wherein N an M are integers, respectively. The sources are also referred to as event publishers, while the sinks are also referred to as event subscribers. There can be any number of sinks and sources. In general, the notification engine 1724 conveys notifications, which are also referred to as events or alerts, from the sources 1726-1728 to the sinks 1736-1738, based in part on parametric information stored in and/or accessed by the context analyzer 1722.

The context analyzer 1722 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification engine 1724, and upon which a user can initiate changes. The parameters may include default parameters as to how the user wishes to be notified in different situations (e.g., such as by cell phone, by pager). The parameters can include such assessments as the costs of disruption associated with being notified by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 1722, according to one aspect of the present invention is inclusive of contextual information determined by the analyzer. The contextual information is determined by the analyzer 1722 by discerning the user's location and attentional status based on one or more contextual information sources (not shown), as is described in more detail in a later section of the description. The context analyzer 1722, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 1726-1728, 1730 generate notifications intended for the user and/or other entity. For example, the sources 1726-1728 may include communications, such as Internet and network-based communications, and telephony communications, as well as software services. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 1730 such that it is prioritized, wherein an application program or system generating the notification assigns the e-mail with a relative priority corresponding to the likely importance or urgency of the e-mail to the user. The e-mail may also be sent without regard to the relative importance to the user. Internet-related services can include notifications including information that the user has subscribed to, such as headlines of current news every so often, and stock quotes, for example.

Notification sources 1726-1728 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

> e-mail desktop applications such as calendar systems;
> computer systems (e.g., that may alert the user with messages that information about alerts about system activity or problems);
> Internet-related services, appointment information, scheduling queries;
> changes in documents or numbers of certain kinds of documents in one or more shared folders;
> availability of new documents in response to standing or persistent queries for information; and/or,
> information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 1736-1738 are able to provide notifications to the user. For example, such notification sinks 1736-1738 can include computers, such as desktop and/or laptop computers, handheld computers, cell phones, landline phones, pagers, automotive-based computers, as well as other systems/applications as can be appreciated. It is noted that some of the sinks 1736-1738 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification engine 1724 accesses the information stored and/or determined by the context analyzer, and determines which of the notifications received from the sources 1726-1728 to convey to which of the sinks 1736-1738. Furthermore, the notification engine 1724 can determine how the notification is to be conveyed, depending on which of the sinks 1736-1738 has been selected to send the information to. For example, it may be determined that notifications should be summarized before being provided to a selected sinks 1736-1738.

The invention is not limited to how the engine 1724 makes its decisions as to which of the notifications to convey to which of the notification sinks, and in what manner the notifications are conveyed. In accordance with one aspect, a decision-theoretic analysis can be utilized. For example, the notification engine 1724 can be adapted to infer important uncertainties about variables including a user's location, attention, device availability, and amount of time until the user will access the information if there were no alert. The notification engine 1724 can then make notification decisions about whether to alert a user to a notification, and if so, the nature of the summarization and the suitable device or devices to employ for relaying the notification. In general, the notification engine 1724 determines the net expected value of a notification. In doing so, it can consider the following:

> the fidelity and transmission reliability of each available notification sink;
> the attentional cost of disturbing the user;
> the novelty of the information to the user;
> the time until the user will review the information on his or her own;
> the potentially context-sensitive value of the information; and/or,
> the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification engine 1724 can make decisions as to one or more of the following:

> what the user is currently attending to and doing (based on, for example, contextual information);
> where the user currently is;
> how important the information is;
> what is the cost of deferring the notification;
> how distracting would a notification be;
> what is the likelihood of getting through to the user; and,
> what is the fidelity loss associated with the use of a specific mode of a given notification sink.

Therefore, the notification engine 1724 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

Furthermore, the notification engine 1724 can access information stored in a user profile by the context analyzer 1722 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification engine 1724 determines how and whether to notify the user.

According to one aspect of the present invention, the notification platform architecture 1700 can be configured as a layer that resides over an eventing or messaging infrastructure. However, the invention is not limited to any particular eventing infrastructure. Such eventing and messaging systems and protocols can include:

> HyperText Transport Protocol (HTTP), or HTTP extensions as known within the art;
> Simple Object Access Protocol (SOAP), as known within the art;
> Windows Management Instrumentation (WMI), as known within the art;
> Jini, as known within the art, Universal Plug and Play; and,
> substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks receive notifications, alerts and events, for example. The present invention is not so limited, however.

Figure 18:
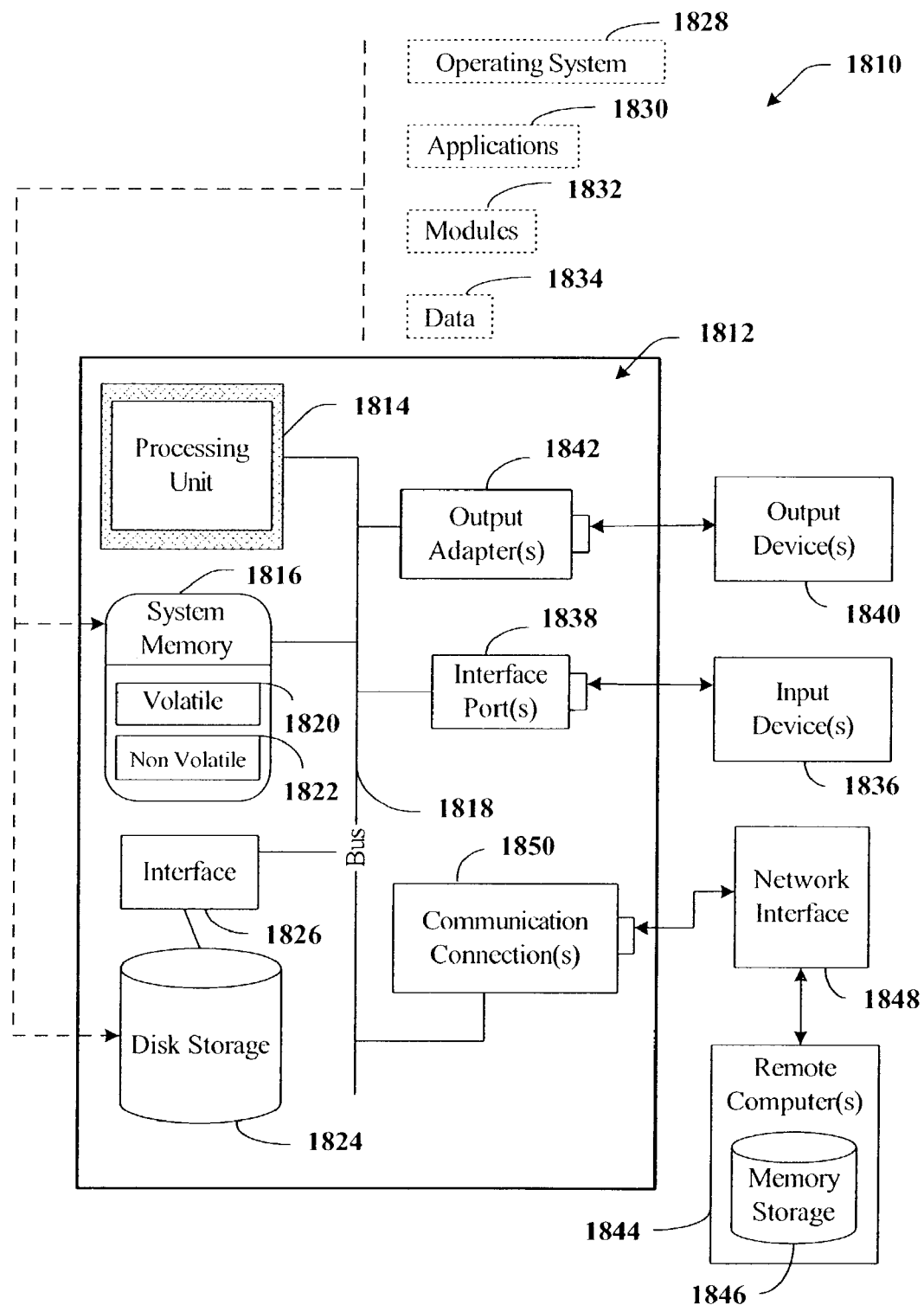
FIG. 18 is a schematic block diagram illustrating a suitable operating environment in accordance with an aspect of the present invention.

With reference to FIG. 18, an exemplary environment 1810 for implementing various aspects of the invention includes a computer 1812. The computer 1812 includes a processing unit 1814, a system memory 1816, and a system bus 1818. The system bus 1818 couples system components including, but not limited to, the system memory 1816 to the processing unit 1814. The processing unit 1814 can be any of various available processors. Dual microprocessors and other multi-processor architectures also can be employed as the processing unit 1814.

The system bus 1818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1816 includes volatile memory 1820 and nonvolatile memory 1822. The basic input/output system (BIOS), containing the basic routines to transfer information between elements within the computer 1812, such as during start-up, is stored in nonvolatile memory 1822. By way of illustration, and not limitation, nonvolatile memory 1822 can include read only memory (ROM), programmable ROM (PROM), electrically programmable ROM (EPROM), electrically erasable ROM (EEPROM), or flash memory. Volatile memory 1820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1812 also includes removable/non-removable, volatile/non-volatile computer storage media. FIG. 18 illustrates, for example a disk storage 1824. Disk storage 1824 includes, but is not limited to, devices like a magnetic disk drive, floppy disk drive, tape drive, Jaz drive, Zip drive, LS-100 drive, flash memory card, or memory stick. In addition, disk storage 1824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1824 to the system bus 1818, a removable or non-removable interface is typically used such as interface 1826.

It is to be appreciated that FIG. 18 describes software that acts as an intermediary between users and the basic computer resources described in suitable operating environment 1810. Such software includes an operating system 1828. Operating system 1828, which can be stored on disk storage 1824, acts to control and allocate resources of the computer system 1812. System applications 1830 take advantage of the management of resources by operating system 1828 through program modules 1832 and program data 1834 stored either in system memory 1816 or on disk storage 1824. It is to be appreciated that the present invention can be implemented with various operating systems or combinations of operating systems.

A user enters commands or information into the computer 1812 through input device(s) 1836. Input devices 1836 include, but are not limited to, a pointing device such as a mouse, trackball, stylus, touch pad, keyboard, microphone, joystick, game pad, satellite dish, scanner. TV tuner card, digital camera, digital video camera, web camera, and the like. These and other input devices connect to the processing unit 1814 through the system bus 1818 via interface port(s) 1838. Interface port(s) 1838 include, for example, a serial port, a parallel port, a game port, and a universal serial bus (USB). Output device(s) 1840 use some of the same type of ports as input device(s) 1836. Thus, for example, a USB port may be used to provide input to computer 1812, and to output information from computer 1812 to an output device 1840. Output adapter 1842 is provided to illustrate that there are some output devices 1840 like monitors, speakers, and printers, among other output devices 1840, that require special adapters. The output adapters 1842 include, by way of illustration and not limitation, video and sound cards that provide a means of connection between the output device 1840 and the system bus 1818. It should be noted that other devices and/or systems of devices provide both input and output capabilities such as remote computer(s) 1844.

Computer 1812 can operate in a networked environment using logical connections to one or more remote computers, such as remote computer(s) 1844. The remote computer(s) 1844 can be a personal computer, a server, a router, a network PC, a workstation, a microprocessor based appliance, a peer device or other common network node and the like, and typically includes many or all of the elements described relative to computer 1812. For purposes of brevity, only a memory storage device 1846 is illustrated with remote computer(s) 1844. Remote computer(s) 1844 is logically connected to computer 1812 through a network interface 1848 and then physically connected via communication connection 1850. Network interface 1848 encompasses communication networks such as local-area networks (LAN) and wide-area networks (WAN). LAN technologies include Fiber Distributed Data Interface (FDDI), Copper Distributed Data Interface (CDDI). Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1850 refers to the hardware/software employed to connect the network interface 1848 to the bus 1818. While communication connection 1850 is shown for illustrative clarity inside computer 1812, it can also be external to computer 1812. The hardware/software necessary for connection to the network interface 1848 includes, for exemplary purposes only, internal and external technologies such as, modems including regular telephone grade modems, cable modems and DSL modems, ISDN adapters, and Ethernet cards.

Figure 19:
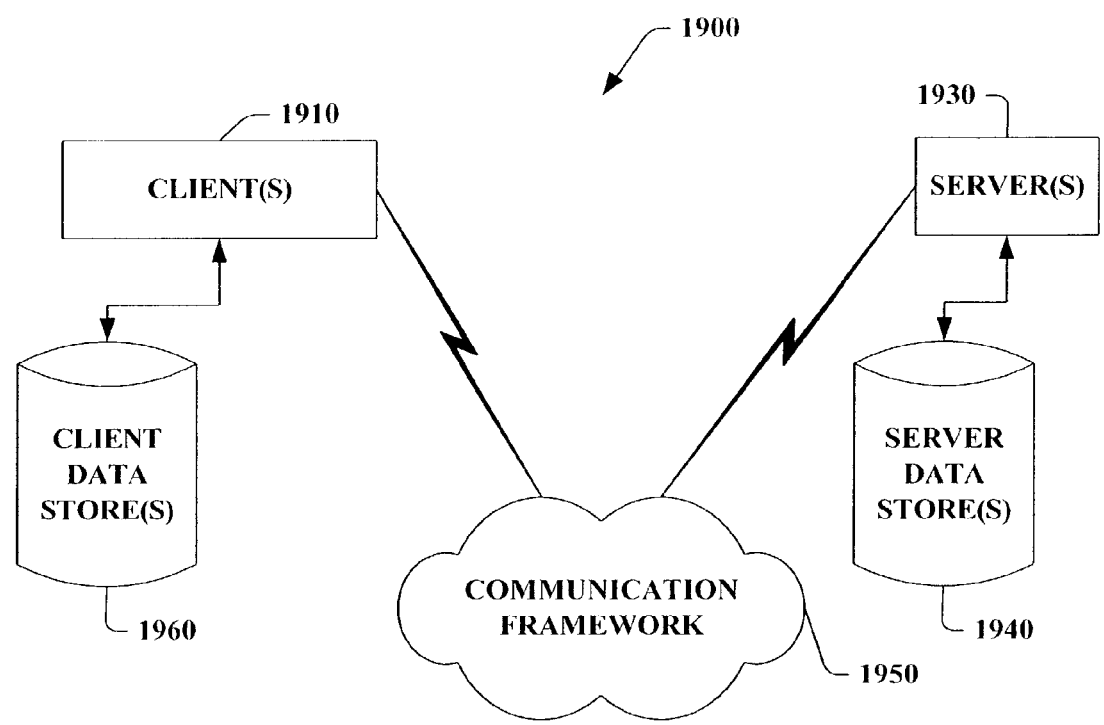
FIG. 19 is a schematic block diagram of a sample-computing environment with which the present invention can interact.

FIG. 19 is a schematic block diagram of a sample-computing environment 1900 with which the present invention can interact. The system 1900 includes one or more client(s) 1910. The client(s) 1910 can be hardware and/or software (e.g., threads, processes, computing devices). The system 1900 also includes one or more server(s) 4180. The server(s) 1930 can also be hardware and/or software (e.g., threads, processes, computing devices). The servers 1930 can house threads to perform transformations by employing the present invention, for example. One possible communication between a client 1910 and a server 1930 may be in the form of a data packet adapted to be transmitted between two or more computer processes. The system 1900 includes a communication framework 1950 that can be employed to facilitate communications between the client(s) 1910 and the server(s) 1930. The client(s) 1910 are operably connected to one or more client data store(s) 1960 that can be employed to store information local to the client(s) 1910. Similarly, the server(s) 1930 are operably connected to one or more server data store(s) 1940 that can be employed to store information local to the servers 1930.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A notification system comprising a computer processor executing software components stored on a computer-readable medium, the software components comprising:
a database engine component that processes received events and subscription information, the database engine component modeling the events and subscriptions as data prior to processing so as to facilitate event and subscription processing;
a notification server component that delivers notifications to subscribers in accordance with the processed events and subscription information, at least one of the database engine component and the notification server component operative in a global web services environment, wherein the notification server determines to which subscribers to send notifications of a received event by performing a join between the received event and the subscriptions that are modeled as data by the database engine; and
a context analyzer component that analyzes information regarding variables and parameters of a user, wherein the notification server component distributes notifications based on the variables and parameters stored by the context analyzer component, and wherein the parameters comprise contextual information discerned based on observations made autonomously via one or more sensors and statistical models, additional parameters conditioned on the contextual information, observations dynamically inferred via automated inference, a user's state specified in real-time and default notification preference parameters;
wherein the notification server component performs a decision-theoretic analysis for pending notifications to determine whether to convey the pending notifications and in what manner to convey the pending notifications, by accessing variables and parameters stored in the context analyzer that indicate user preference.

2. The system of claim 1, the global web services environment includes a global XML web services architecture (GXA) to facilitate event, subscription, and notification processing.

3. The system of claim 2, the GXA includes at least one of a discovery component, a description component, a protocol component, an asynchronous messaging component, a reliable messaging component, a transactions component, and a security component.

4. The system of claim 2, the GXA includes a protocol component, the protocol component includes at least one of Simple Object Access Protocol (SOAP) that is employed as a communications protocol for XML Web services, an HTTP protocol, an SMTP protocol, a TCP/IP protocol, a Direct Internet Message Encapsulation (DIME) protocol utilized for binary message exchanges, and a transaction or routing delivery protocol to facilitate notification processing.

5. The system of claim 2, the GXA includes a discovery component, the discovery component includes at least one of an inspection schema, a Web Services Description Language (WSDL) component, and a Universal Discovery Description and Integration (UDDI) component.

6. The system of claim 2, the GXA includes a description component, the description component includes a meta-data component that describes one or more aspects of a notification service.

7. The system of claim 6, the description component facilitates negotiations between nodes about available communications mechanisms and protocols for negotiating characteristics of message exchange.

8. The system of claim 7, the description component facilitates at least one of security negotiations, security authentications, and security authorizations, the security negotiations including at least one of WS-Policy, WS-Policy Assertions, and WS-Policy Bindings.

9. The system of claim 2, the GXA includes a discovery component and a description component, the discovery component and the description component employ an Application Definition File (ADF) to facilitate discovery and description of notification services.

10. The system of claim 2, the GXA includes an asynchronous messaging component, the asynchronous messaging component includes at least one of an asynchronous protocol, an eventing protocol, and a routing protocol.

11. The system of claim 10, the asynchronous protocol includes a web service AsyncMSG (WS-AsyncMSG) protocol that is defined by an XML SOAP extension, and includes at least one of end-to-end message information, hop-by-hop message information, and correlation information between messages.

12. The system of claim 10, the asynchronous messaging component includes a routing protocol, the routing protocol includes a web services routing protocol (WS-Routing) for exchanging one-way SOAP messages and a subscription submission/notification delivery protocol that includes a web services eventing protocol (WS-Eventing).

13. The system of claim 1, the notification server component further comprising at least one of an event provider, an event collector, a message queue component, and a Distributed Transaction Coordinator (DTC) to process notifications.

14. The system of claim 13, further comprising a Transaction Server (MTS) having at least one resource manager to process the notifications.

15. The system of claim 13, the notification server component employs an "exactly once" protocol to deliver notifications.

16. The system of claim 1, the notification server component further comprising a message queue component, the message queue utilizes at least one of a commit and an abort function when processing notifications.

17. The system of claim 1, the database engine component employing an SQL database application.

18. The system of claim 1, further comprising a priorities component to determine a notification ordering for one or more received notifications.

19. A computer implemented notification method, comprising the following computer executable acts:
abstracting subscription and event information as data;
storing the subscription and event data in respective tables, the tables being propagated with the subscription and event information;
upon a notification event occurring, processing the subscription and event data to generate notification data in accordance with a messaging protocol, wherein processing the subscription and event data comprises performing a join between the event data and the subscription data to determine for which subscribers notification data regarding the notification event should be generated;
employing an event protocol processed in accordance with a web services protocol to facilitate processing subscriptions and notification events;
analyzing information regarding variables and parameters of a user that influence notification decision-making, wherein the parameters comprise contextual information discerned based on observations made autonomously via one or more sensors and statistical models, additional parameters conditioned on the contextual information, observations dynamically inferred via automated inference, a user's state specified in real-time and default notification preference parameters;
delivering notifications to subscribers in accordance with the variables and parameters; and
performing a decision-theoretic analysis for pending notifications to determine whether to convey the pending notifications and in what manner to convey the pending notifications, by accessing variables and parameters that indicate user preference.

20. The method of claim 19, further comprising employing at least one of an event provider process, an event collector process, an event flush process, and a message delivery process.

21. The method of claim 19, further comprising employing an event provider process, the event provider process further comprising at least one of:
initiating a Distributed Transaction Coordinator (DTC) transaction;
de-queuing a message;
committing the DTC transaction; and
aborting the DTC transaction.

22. The method of claim 19, further comprising employing an event collector process, the event collector process further comprising at least one of:
determining if a DTC transaction has started;
starting a database transaction;
inserting a row into an event batch table; and
inserting a new event row in another event table.

23. The method of claim 19, further comprising employing an event flush process, the event flush process further comprising at least one of:
updating a batch header;
committing a DTC transaction; and
aborting the DTC transaction depending on a flush parameter.

24. The method of claim 19, further comprising employing a message delivery process, the message delivery process further comprising at least one of:
initiating a DTC transaction;
calling a delivery protocol handler;
marking a row in a database to indicate a message has been delivered; and
committing the DTC transaction.

25. One or more computer readable media storing computer executable instructions which when executed by a processor perform the following method:
abstracting subscription and event information as data;
storing the subscription and event data in respective tables, the tables being propagated with the subscription and event information;
upon a notification event occurring, processing the subscription and event data to generate notification data in accordance with a messaging protocol, wherein processing the subscription and event data comprises performing a join between the event data and the subscription data to determine for which subscribers notification data regarding the notification event should be generated;
employing an event protocol processed in accordance with a web services protocol to facilitate processing subscriptions and notification events;
analyzing information regarding variables and parameters of a user that influence notification decision-making, wherein the parameters comprise contextual information discerned based on observations made autonomously via one or more sensors and statistical models, additional parameters conditioned on the contextual information, observations dynamically inferred via automated inference, a user's state specified in real-time and default notification preference parameters;
delivering notifications to subscribers in accordance with the variables and parameters; and
performing a decision-theoretic analysis for pending notifications to determine whether to convey the pending notifications and in what manner to convey the pending notifications, by accessing variables and parameters that indicate user preference.

26. The computer readable media of claim 25, wherein the method performed by the execution of the computer executable instructions further comprises:
employing at least one of an event provider process, an event collector process, an event flush process, and a message delivery process.

27. The computer media of claim 25, wherein the method performed by the execution of the computer executable instructions further comprises:
employing an event provider process, the event provider process further comprising at least one of:
initiating a Distributed Transaction Coordinator (DTC) transaction;
de-queuing a message;
committing the DTC transaction; and
aborting the DTC transaction.

28. The computer storage readable media of claim 25, wherein the method performed by the execution of the computer executable instructions further comprises:
employing an event collector process, the event collector process further comprising at least one of:
determining if a DTC transaction has started;
starting a database transaction;
inserting a row into an event batch table; and
inserting a new event row in another event table.

29. The computer readable media of claim 25, wherein the method performed by the execution of the computer executable instructions further comprises:
employing an event flush process, the event flush process further comprising at least one of:
updating a batch header;

committing a DTC transaction; and aborting the DTC transaction depending on a flush parameter.

30. The computer readable media of claim 25, wherein the method performed by the execution of the computer executable instructions further comprises:

employing a message delivery process, the message delivery process further comprising at least one of:

initiating a DTC transaction;

calling a delivery protocol handler;

marking a row in a database to indicate a message has been delivered; and committing the DTC transaction.

* * * * *